(12) United States Patent
Bonnefoy et al.

(10) Patent No.: US 11,851,186 B2
(45) Date of Patent: Dec. 26, 2023

(54) MINI SUITE EMERGENCY EGRESS SOLUTIONS

(71) Applicants: Safran Seats USA LLC, Gainesville, TX (US); Safran Seats, Plaisir (FR)

(72) Inventors: Bastien Bonnefoy, Issoudun (FR); Arthur K. Glain, Huntington Beach, CA (US); Victor Carlioz, Newport Beach, CA (US); Matthew Cleary, Newport Beach, CA (US); Eric O. Freienmuth, Marana, AZ (US); Patrick Herault, Saint Hilaire en Lignieres (FR); Christopher La Montagna, Long Beach, CA (US)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 0 days.

(21) Appl. No.: 18/102,352

(22) Filed: Jan. 27, 2023

(65) Prior Publication Data

US 2023/0174236 A1 Jun. 8, 2023

Related U.S. Application Data

(63) Continuation of application No. 16/349,636, filed as application No. PCT/US2017/061689 on Nov. 15, 2017, now Pat. No. 11,591,090.

(Continued)

(51) Int. Cl.
*B64D 11/06* (2006.01)
*B64D 11/00* (2006.01)

(52) U.S. Cl.
CPC ...... *B64D 11/0606* (2014.12); *B64D 11/0023* (2013.01); *B64D 11/0639* (2014.12); *B64D 2011/0046* (2013.01)

(58) Field of Classification Search
CPC ............ B64D 11/0023; B64D 11/0606; B64D 2011/0046; B64C 1/1423; B64C 1/1438;
(Continued)

(56) References Cited

U.S. PATENT DOCUMENTS 6,209,171 B1 * 4/2001 Pelletier ................ E05D 15/063
403/374.5
6,257,523 B1 7/2001 Olliges
(Continued)

FOREIGN PATENT DOCUMENTS

| CN | 104703866 A | 6/2015 |
| EP | 1106502 A1 | 6/2001 |
| FR | 2978190 A1 | 1/2013 |

OTHER PUBLICATIONS

International Patent Application No. PCT/US2017/061689, Search Report and Written Opinion, dated Feb. 16, 2018.
(Continued)

*Primary Examiner* — Brady W Frazier
*Assistant Examiner* — Colin Zohoori
(74) *Attorney, Agent, or Firm* — Kilpatrick Townsend & Stockton LLP

(57) ABSTRACT

Passenger seats having improved comfort emergency egress solutions for mini suites or other types of passenger seats that have a privacy screen, wall, or sliding door that divides the passenger seat from the aisle area or other common area. Specific embodiments find particular use on-board passenger transportation vehicles, such as aircraft, where comfort and privacy must be balanced with safety and federal regulations.

4 Claims, 22 Drawing Sheets

Related U.S. Application Data

(60) Provisional application No. 62/424,349, filed on Nov. 18, 2016, provisional application No. 62/422,257, filed on Nov. 15, 2016.

(58) Field of Classification Search
CPC ....... B64C 1/32; E05D 15/063; E06B 3/4423; E06B 3/4654
See application file for complete search history.

(56) References Cited

U.S. PATENT DOCUMENTS

| | | | | |
|---|---|---|---|---|
| 7,117,559 | B1* | 10/2006 | Barber | E05D 15/063 16/105 |
| 2004/0173327 | A1 | 9/2004 | Steel et al. | |
| 2006/0145007 | A1 | 7/2006 | Melberg et al. | |
| 2006/0230684 | A1* | 10/2006 | Poole | E05D 15/0634 49/409 |
| 2008/0196206 | A1* | 8/2008 | Chen | E05D 15/063 16/87 R |
| 2013/0020369 | A1 | 1/2013 | Ple | |
| 2013/0241247 | A1 | 9/2013 | Wallace et al. | |
| 2014/0158826 | A1 | 6/2014 | Young et al. | |
| 2015/0211275 | A1* | 7/2015 | Terno | E05D 15/0634 16/93 R |
| 2017/0051554 | A1* | 2/2017 | Dastrup | E06B 3/4654 |
| 2017/0283064 | A1 | 10/2017 | Robinson | |

OTHER PUBLICATIONS

China Patent Application No. 201780078966.9 Office Action, dated Jun. 23, 2021.
Europe Patent Application No. 20214660.1, Extended European Search Report, dated May 25, 2021.
China Patent Application No. 2017800789669, Office Action, dated Jan. 7, 2022.
Europe Patent Application No. 20214660.1, Office Action, dated Mar. 1, 2022.
Europe Patent Application No. 17809113.8, Office Action, dated Mar. 3, 2022.
China Patent Application No. 2017800789669, Office Action, dated Apr. 26, 2022.
China Patent Application No. 2017800789669, Office Action (Rejection Decision), dated Aug. 8, 2022.
U.S. Appl. No. 16/349,636, Non-Final Office Action, dated Jun. 7, 2021.
U.S. Appl. No. 16/349,636, Final Office Action, dated Oct. 26, 2021.
U.S. Appl. No. 16/349,636, Advisory Action, dated Jan. 12, 2022.
U.S. Appl. No. 16/349,636, Non-Final Office Action, dated Feb. 15, 2022.
U.S. Appl. No. 16/349,636, Final Office Action, dated Jul. 11, 2022.
U.S. Appl. No. 16/349,636, Advisory Action, dated Sep. 14, 2022.
U.S. Appl. No. 16/349,636, Notice of Allowance, dated Nov. 21, 2022.
26 Europe Patent Application No. 17809113.8, Communication under Rule 71(3) EPC, dated Mar. 14, 2023, 8 pages.

* cited by examiner

MINI SUITE EMERGENCY EGRESS SOLUTIONS

CROSS REFERENCE TO RELATED APPLICATIONS

This application is a continuation of U.S. Nonprovisional patent application Ser. No. 16/349,636, filed on May 14, 2019, titled "Mini Suite Emergency Egress Solutions," which is the national phase application of International Patent Application No. PCT/US2017/061689, filed on Nov. 15, 2017, titled "Mini Suite Emergency Egress Solutions," which claims the benefit of U.S. Provisional Application Ser. No. 62/422,257, filed Nov. 15, 2016, titled "Mini Suite Emergency Egress," and U.S. Provisional Application Ser. No. 62/424,349, filed Nov. 18, 2016, titled "Mini Suite Emergency Egress," all of which are hereby incorporated by reference.

FIELD OF THE DISCLOSURE

The field of this disclosure relates to passenger seats having improved comfort emergency egress solutions for mini suites or other types of passenger seats that have a privacy screen, wall, or sliding door that divides the passenger seat from the aisle area or other common area. Specific embodiments find particular use on-board passenger transportation vehicles, such as aircraft, where comfort and privacy must be balanced with safety and federal regulations.

BACKGROUND

Many vehicles such as passenger aircraft, buses, trains, ships, automobiles, and the like include seats for bearing passengers en route to a destination. Many seats are provided with privacy shells or screens that enable a passenger occupying the seat to have an enclosed feeling. For example, a privacy screen, wall, or sliding door (collectively referred to as a "privacy feature") may be provided that divides the passenger seat from the aisle area or other common area.

Vehicle passenger seats are also subject to safety requirements established by governments or other standard-setting organizations. While passenger comfort and privacy are important considerations in seat design, it is also necessary to provide a safe egress from the seat in the event of an emergency, particularly in the case of seats that are enclosed by a seat privacy shell or other privacy feature. For example, some federal regulations have typically required that no door may be installed between any passenger and any emergency exit space or aisle. Accordingly, any privacy feature that may be associated with the passenger seat must allow a safe and timely exit from the seat.

However, passenger comfort has dictated that certain classes of seats benefit from privacy. Accordingly, many airlines are seeking to provide seats with privacy doors or screens, and aircraft interior designers have been tasked with making such privacy doors or screens as safe as possible. Some privacy doors or screens are designed to slide with respect to a sidewall.

One particular design requirement has been to require any enclosed suite or mini suite (which term is generally used to refer to a passenger seating area or space that has a privacy feature positioned between the seat and the aisle or other common area) to have an enclosure that has a secondary opening feature (or secondary egress) in the event that the primary opening feature (primary egress) fails in a deployed or closed position. For example, if the primary egress means for the door gets stuck in a deployed position, a secondary egress means must be provided in order to prevent the seat from dangerously trapping the passenger. Any door that may be positioned between the passenger in the aisle is thus desirably designed such that if the primary means of egress is disabled, a secondary means of egress is provided. The general intent is to ensure that a passenger does not become trapped within the enclosed suite or mini suite, without a safe alternate egress route. Climbing over a passenger seat shell is generally not considered a safe secondary exit route. Accordingly, appropriate mechanical alterations to the primary opening feature of the privacy feature are desirable.

BRIEF SUMMARY

Embodiments of the invention described herein thus provide systems and methods for privacy features comprising both primary and secondary egress route access options.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a passenger seat egress system, comprising a passenger seat area divided from an aisle or other common area by a privacy feature, wherein the privacy feature offers a primary egress from the passenger seat area and a secondary egress from the passenger seat area. The primary egress may be a sliding door configured to slide into and out of a wall pocket in order to open a close a passageway space. In one example, the secondary egress may be one or more hinges on the sliding door, such that if sliding movement into and out of the wall pocket is blocked, the door is hingeable. The one or more hinges comprise one or more vertical hinges that hinge the door away from the passageway space.

In another example, the sliding door may be a plurality of vertical panels, and wherein the one or more hinges comprise vertical hinges that allow the panels to accordion fold. In another example, the sliding door may be more than one horizontal panel, and wherein the one or more hinges comprise one or more horizontal hinges that allow an upper panel to fold over a lower panel. In a further example, the sliding door may be a plurality of panels, and wherein the secondary egress comprises a first panel that drops into a pocket of a second panel. It is possible for the secondary egress to be removing the sliding door from the housing frame.

In another example, the primary egress may be first and second sliding doors configured to slide into and out of front and rear wall pockets in order to open a close a passageway space. The secondary egress may be at least one of the first and second sliding doors comprising a lowerable section. Alternatively, the secondary egress may be a removable panel. In a further example, the primary egress comprises a first and second sliding doors configured to slide into and out of a central stow feature.

Another example provides the privacy feature as being one or more hinged panels, with a releaseable securement member configured to secure the hinged panels as a rigid door and wherein removal of the releaseable securement member allows the panels to hinge.

Also disclosed is a passenger seat egress system, comprising: a passenger seat area divided from an aisle or other common area by a privacy feature, wherein the privacy feature offers a primary egress from the passenger seat area and a secondary egress from the passenger seat area, wherein the primary egress comprises a sliding door mounted on a track system housed within a housing, wherein the secondary egress comprises releasing the door from the track system and storing the door in the housing.

DETAILED DESCRIPTION

Figure 1:
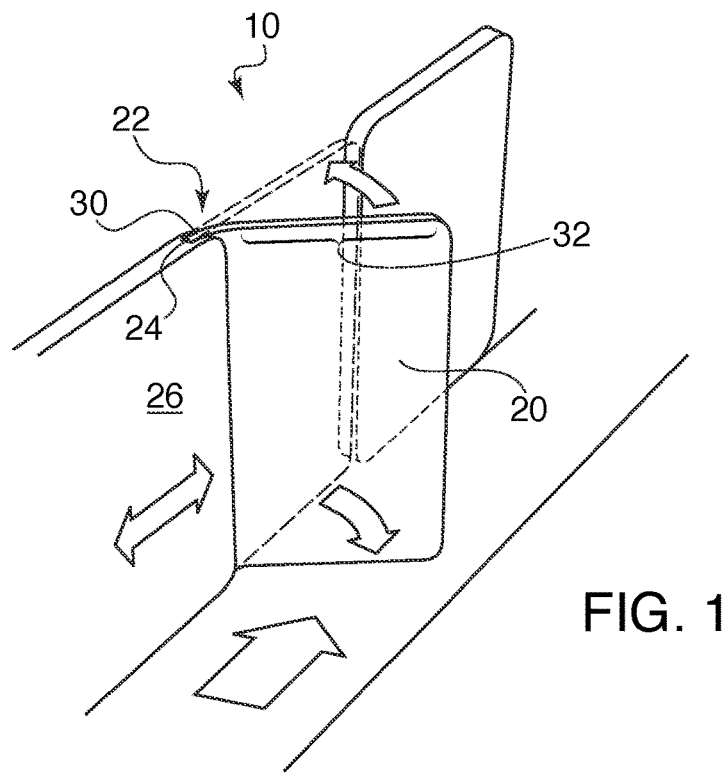
FIG. 1 shows a side perspective view of one embodiment of a mini suite egress system with a hinged door.

The described embodiments provide improved emergency egress solutions for passenger seats. While the improved emergency egress solutions are described in connection with aircraft seats, they are by no means so limited. Rather, the embodiments disclosed may be used in passenger seats or other seats of any type or otherwise as desired.

Fully enclosed suites are traditionally installed only on low density first class aircraft cabins, but there is a current desire to certify suites or mini suites or other types of more private seating arrangements (i.e., those having one or more privacy features separating the aircraft seat from the aircraft aisle or other common area) for other aircraft areas. For example, it would be desirable to have a mini suite option for larger business class cabins, in which privacy remains a concern, but for which balancing of cost is also desirable. By providing a privacy feature with a secondary egress option in addition to the primary egress option envisioned, it is believed that certification will become increasingly possible, making such improved suites or mini suites a desirable and viable option for aircraft companies.

A number of various embodiments for emergency egress from a mini suite are described herein. As used herein, the term "mini suite" is intended to mean any type of passenger seating area or passenger space 10 that is bounded by a privacy feature positioned between the passenger seating area/space 10 and the aisle 14 or any other common area. A mini suite generally provides a passenger with more privacy than a typical unbounded passenger seat. As used herein, the term "privacy feature" is intended to mean any type of door, closure, screen, wall, partition, movable panel, swinging door, telescoping door, or any other feature that creates at least a partial of privacy for a seat occupant. Non-limiting examples of various privacy features are described and shown herein.

According to current regulations, in the taxi, takeoff and landing (TTL) configuration, the mini-suite must provide an unobstructed access to the main aisle having a width of at least 30 cm (12 inches) at a height lower than 64 cm (25 inches) from the floor, and of at least 38 cm (15 inches) at a height of 64 cm (25 inches) and more from the floor. A narrower width not less than 23 cm (9 inches) at a height below 64 cm (25 inches) from the floor may be approved when substantiated by tests found necessary by the Agency. It is understood that these regulations can and do change periodically. It is envisioned that the passenger seats described herein may have their sizes altered in order to fit within the requirements. Accordingly, specific door heights, depths, and other dimensions are not required and it should be understood that modifications are possible and considered within the scope of this disclosure.

In addition, the mini-suite must have an Emergency Passage Feature (EPF) to allow for evacuation of the mini-suite occupant in the event a door closes and becomes jammed during an emergency landing. The EPF must provide a free aperture for passage into the aisle consistent with current regulations requiring a clear access. Alternatively, the passage should comply with other regulations applicable to a Type IV emergency exit, which requires a 19×26 inch window be available.

If the EPF consists of frangible and/or removable elements, they should be easily broken/removed by the occupant of the mini-suite when a door becomes jammed. If the EPF consists of dual independent sliding doors opening in opposite directions, the remaining unobstructed access width with one door in the fully closed position must be consistent with SC13 or meet the requirements of CS 25.807 applicable to a Type IV emergency exit.

In general, mini suite installation should not encroach into any required main aisle, cross aisle or passage ways. Mini suite doors may not impede main aisle or cross aisle egress paths in the open, closed, or translating position. Accordingly, with these regulations being considered, the following mini suite privacy door or screen configurations have been developed.

As illustrated by FIG. 1, one embodiment provides a sliding door 20 with a breakaway hinge 22. The primary egress means for leaving the mini suite 10 is sliding the door 20 into a pocket 24 contained in side wall 26. However, if the sliding door 20 were to become stuck or otherwise lodged in the closed position, the breakaway hinge 22 provides a secondary egress means. In one example, the breakaway hinge 22 can be an upper hinge portion and a lower hinge portion generally positioned along a far edge of the door 20. If the door 20 were to fail in the fully open position, the upper and lower hinge portions can be used to hinge the far edge of the door 20 open. In another example, the breakaway hinge 22 may be a longitudinal hinge that extends the height of the door 20. For example, the hinge may be a piano hinge or other elongated hinge. In this example, it is possible for a rear portion 30 of the door 20 to remain within the pocket 24 of the wall so that only the forward portion 32 of the door 20 hinges 20.

Figure 2A:
FIG. 2A shows a schematic of a sliding door in a stowed configuration.
Figure 2B:
FIG. 2B shows a schematic of the sliding door in a deployed position.
Figure 2C:
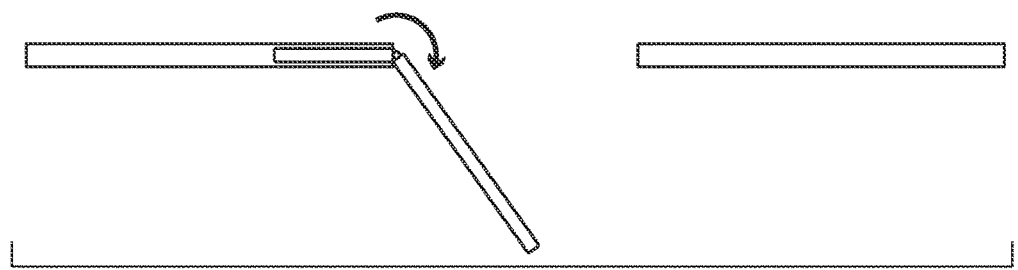
FIG. 2C shows a schematic of the secondary egress option, a hinged door.

In order to activate the secondary egress means, the passenger would release or activate a lever, trigger, latch, or other release mechanism that holds or otherwise maintains the door 20 in a straight plane. Release or activation of the a lever, trigger, latch, or other release mechanism an arm that maintains the door 20 in the straight plane (aligned with the pocket 24 of the wall 26). Exemplary releasable securement members are described further below and are considered possible for use with any of the embodiments disclosed herein. Activation of the release mechanism releases the door 20 to swing either inward or outward from the passenger space 10. The trigger or lever may be labeled "Emergency" or "Pull in case of emergency" or with any other appropriate label to indicate to the passenger that there is an alternate egress means. This flow is illustrated by FIGS. 2A, 2B, and 2C.

The sliding door 20 may also be provided with a spring loaded feature that is biased to force the door 20 back into alignment with the plane of the wall 26 (once opening pressure is released from the door). The spring loaded feature will generally be positioned at or near the breakaway hinge 22. Once the passenger releases opening or closing pressure on the door (and otherwise leaves the passenger space 10), the door 20 swings back to its closed position, aligned between walls 26. This leaves the aisle 14 unblocked so that other passengers may exit.

Figure 3:
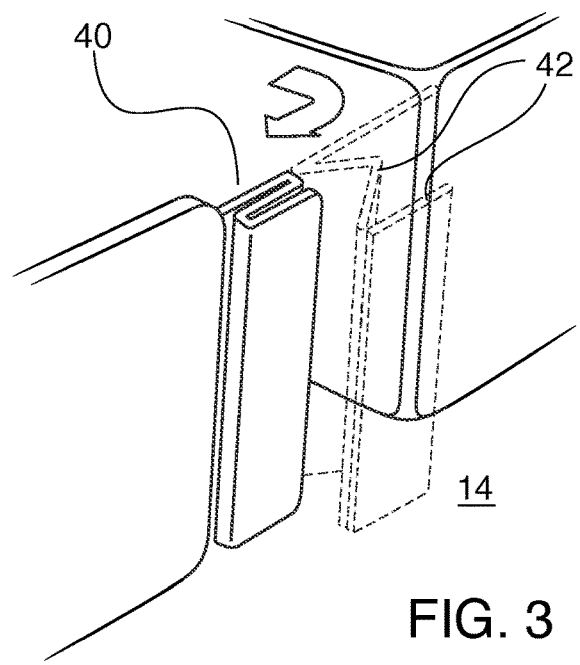
FIG. 3 shows a side perspective view of one embodiment of a mini suite egress system with a folding accordion door.
Figure 4A:
FIG. 4A shows a schematic of a sliding door in a stowed configuration.
Figure 4B:
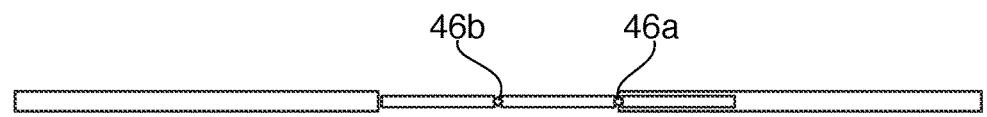
FIG. 4B shows a schematic of the sliding door in a deployed position.
Figure 4C:
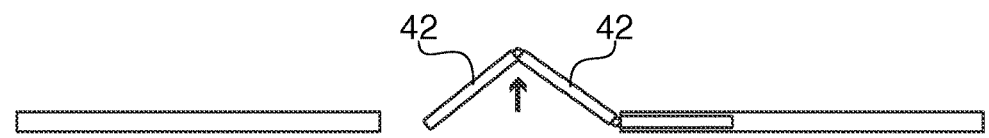
FIG. 4C shows a schematic of the secondary egress option, a folding door.
Figure 4D:
FIG. 4D shows a schematic view of the folding door in a folded and flat configuration.
Figure 5A:
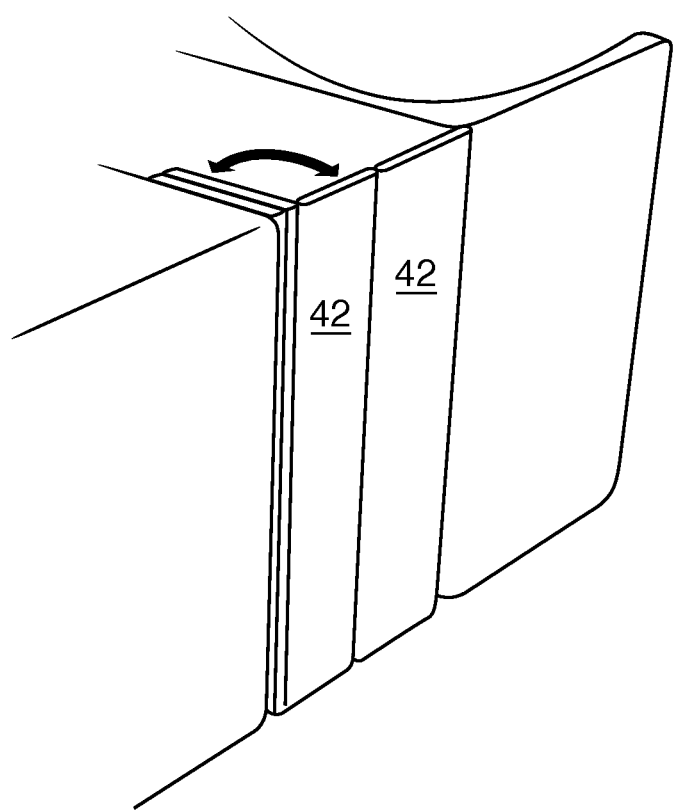
FIG. 5A shows a side perspective view of one embodiment of a mini suite egress system with a folding accordion door.
Figure 5B:
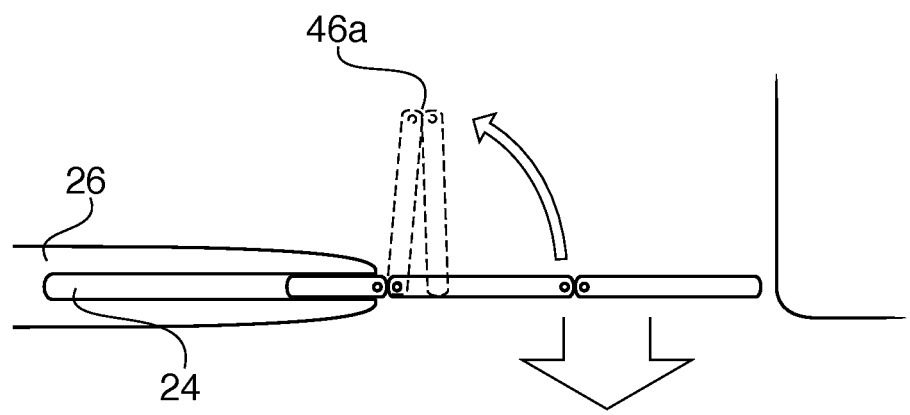
FIG. 5B shows a top plan view of the system of FIG. 5A in a folded open and flat configuration.

FIG. 3 illustrates an alternate embodiment that uses a vertically hinged accordion door 40. The design of the accordion door 40 can help avoid the problem of a door swinging or otherwise entering into the passenger aisle. In this example, the primary egress use of door 40 is to slide the door 40 in and out of a pocket 24 of a sidewall 26 (similar to the movements described above for door 20). However, the secondary means of egress from the door is an accordion-like movement, similar to the opening and closing of a lavatory door. The door 40 is thus formed of at least two panels 42 that fold upon themselves when the door 40 is in an secondary open position (allowing ingress and egress to the passenger space 10). The at least two panels 42 may be designed so that in typical use, they maintain a straight panel configuration that deploys forward and aftward in use in order to provide privacy, as illustrated by FIG. 4A. If the door 40 were to get stuck in a deployed position as illustrated by FIG. 4B, the at least two panels 42 are configured to fold with respect to one another. In one example, the at least two panels 42 fold inwardly, away from the aisle 14. Hinges 46 may extend vertically along the accordion door. It is generally envisioned that at least one hinge 46a will be positioned at the joint between side wall 26 and the door 40. At least one additional hinge 46b will be positioned between the at least two panels 42. Accordion door 40 may function similarly to a lavatory door. When the accordion door 40 is in a closed position, the panels 42 maintain the appearance of a single panel. When the accordion door is opened using the secondary means of egress, a lever, trigger, latch, or other release mechanism disables the feature that maintains the at least two panels 42 in the straight planar panel configuration, and releases the hinge 46*b*. Release of the hinge 46*b* allows the at least two panels 42 to accordion onto one another, as illustrated by FIGS. 3 and 4D. It is also possible that the at least two panels will fold flat upon one another and the side hinge 46*a* may be used to rotate the stacked panels out of the aisle, as illustrated by FIGS. 4A-4D and FIG. 5A-5B.

Figure 6:
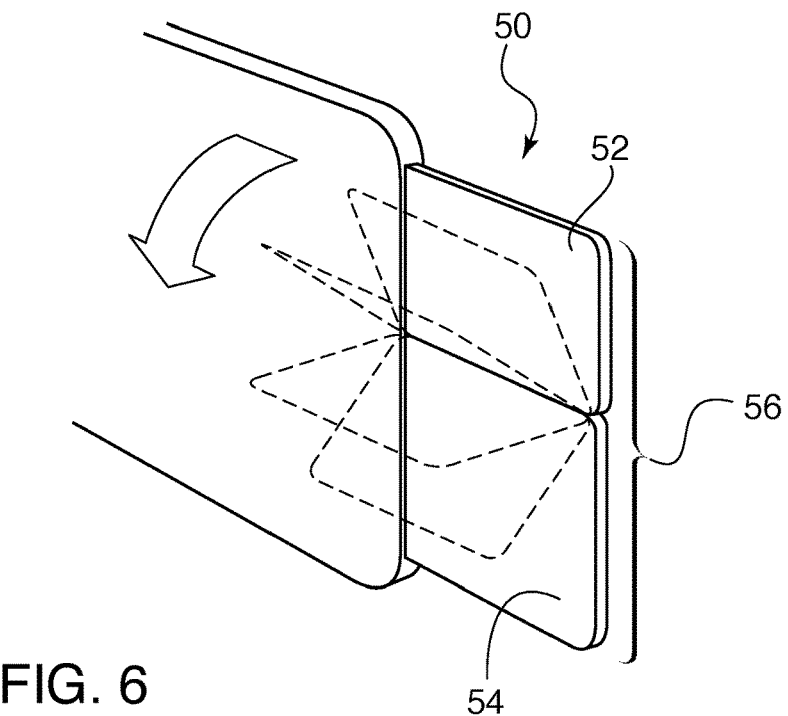
FIG. 6 shows a side perspective view of one embodiment of a mini suite egress system with a horizontally hinged door.

FIG. 6 illustrates a fold down panel embodiment. In this example, the door 50 is provided with a fold down panel 52. The fold down panel 52 may be hingedly connected, latched, or otherwise secured to a lower panel 54. In other words, the door 50 has two portions: a first lower portion 54 and a second foldable portion 52. For primary egress, the two portions 54 and 52 are attached such that they form a planar panel 56, as illustrated by the solid lines. The planar panel 56 may slide into a pocket 24 of the wall 26, as described for other embodiments above. However, the secondary egress may be accomplished by releasing a lever, trigger, latch, or other release mechanism that maintains the two portions 54 and 52 as a planar panel 56, so that the fold down panel 52 is allowed to release and fold down over the lower panel 54. This is illustrated by the dotted lines in FIG. 6. The fold over may occur inwardly (toward the passenger space 10) or outwardly (toward the aisle). In either event, it is generally envisioned that the two panels 52, 54 will then stack over one another so that the passenger may step over the lower panel 54 to escape the passenger space 10. This type of exit is generally referred to as a Type IV egress. In other words, the passenger does not have an absolutely clear path to the aisle, but is required to step over only a short obstruction. For many requirements, as long as the obstruction is no less than 11 inches high, egress is still possible and considered safe. Accordingly, in one example, the lower panel 54 may be about 9 to about 11 inches high.

Figure 7:
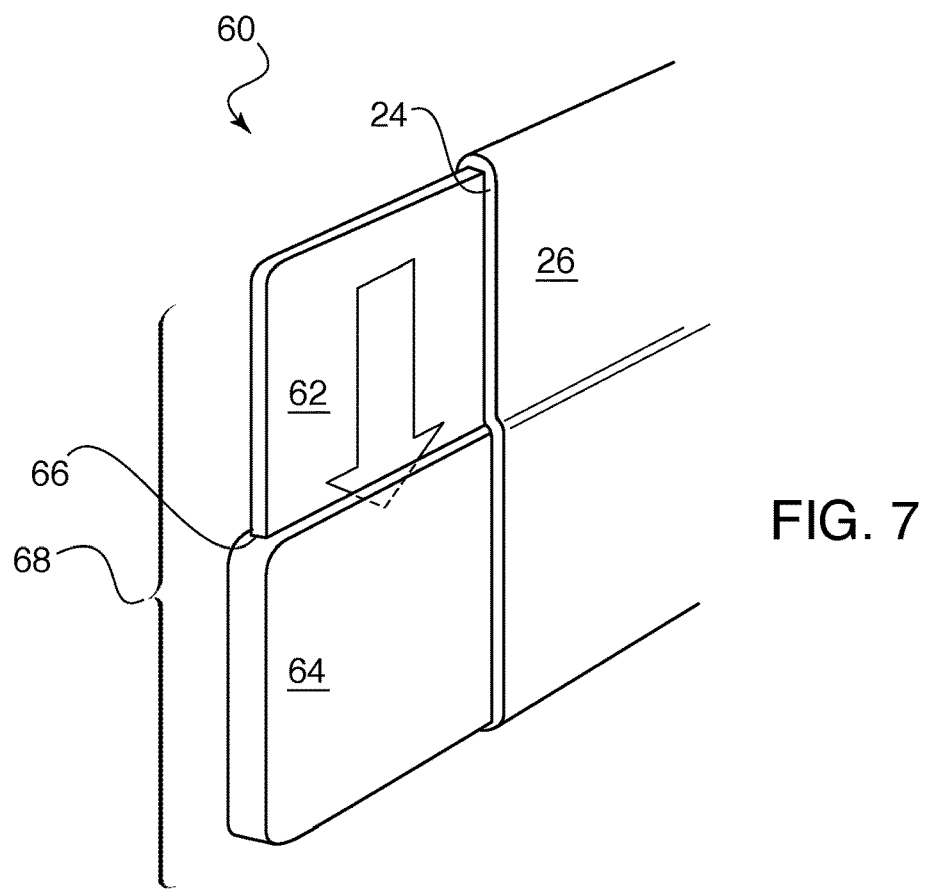
FIG. 7 shows a side perspective view of one embodiment of a mini suite egress system with a drop down door.

FIG. 7 illustrates a drop down panel embodiment. In this example, the door 60 is provided with a drop down panel 62. The drop down panel 62 may be slidably cooperable with a lower panel 64. As illustrated, lower panel 64 may have an internal pocket 66 into which the drop down panel 62 may be received. For primary egress, the drop down panel 62 is extended from the lower panel 64 and locked into position therewith, such that panels 62 and 64 form a planar panel 68. The planar panel 68 may slide into a pocket 24 of the wall 26, as described for other embodiments above. Because the lower panel may have a larger thickness that some other embodiment, it should be understood that the pocket of the wall may be enlarged appropriately. The secondary egress may be accomplished by releasing a lever, trigger, latch, or other release mechanism that maintains the two portions 64 and 62 as a planar panel 56, so that the drop down panel 62 is allowed to release and drop down into the pocket 66 of the lower panel 64. In this configuration, the lower panel 64 receives the upper drop down panel 64 so that the lower panel forms a lower wall. The passenger may step over the lower wall (the external shell of the lower panel 64) to escape the passenger space 10. This type of exit is generally referred to as a Type IV egress. In other words, the passenger does not have an absolutely clear path to the aisle, but is required to step over only a short obstruction. For many requirements, as long as the obstruction is no less than 11 inches high, egress is still possible and considered safe. Accordingly, in one example, the lower panel 64 may be about 9 to about 11 inches high.

In an alternate embodiment, the lower panel 64 may actually be formed as two separate panels with a space therebetween. In use, the two-part lower panel 64 and the drop down panel 62 are secured. When secondary egress is necessary, the drop down panel 62 is dropped into the space between the two separate lower panels.

Figure 8A:
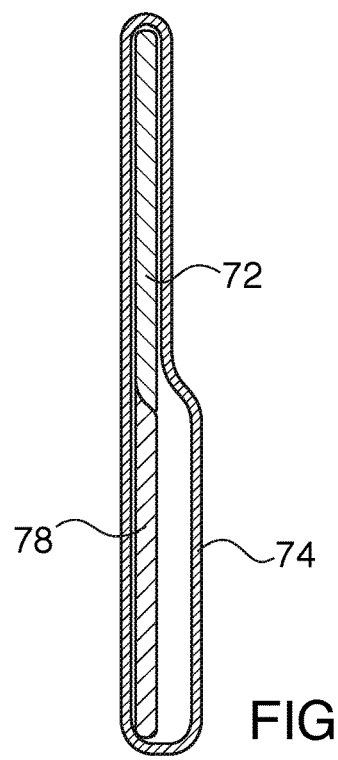
FIG. 8A shows a side perspective view of one embodiment of a mini suite egress system with an alternate drop down door.
Figure 8B:
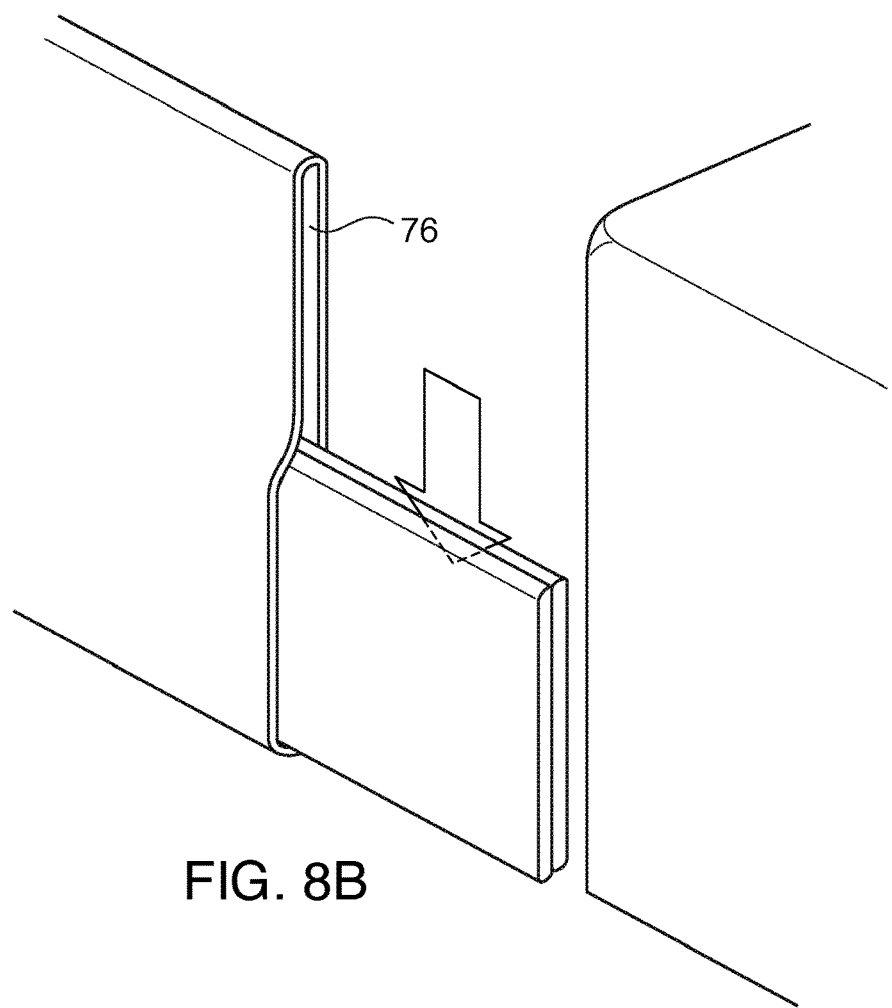
FIG. 8B shows a side cross-sectional view of the system of FIG. 8A.

FIGS. 8A and 8B illustrate an alternate type of drop down panel system. In this example, a door 70 is formed by first and second panels 72 and 74. As illustrated by side cross-sectional view of FIG. 8A, the first panel 72 may be an upper panel that is received by a first wall pocket opening 76. The first wall pocket opening 76 is generally sized and configured to slidingly receive the first panel 72. The second panel 74 may be a lower panel that is received by a second wall pocket opening 78. The second wall pocket opening 78 is generally sized and configured to slidingly receive both the first panel 72 and the second panel 74 in a stacked, side-by-side configuration. In a deployed configuration, the first panel will be in a configuration and generally abut the second panel 74 in an end-to-end configuration. The two panels 72, 74 can be deployed collectively, such that they may extend from the wall pocket openings 76, 78 together and form a single panel. In this example, it is possible for there to be a pin or track or other securement feature that maintains the first panel 72 above the second panel 74. Alternatively, the two panels can be deployed separately, such that the first panel 72 may be extended completely across the space, or may be extended only partially across the space, depending upon the amount of privacy desired by the passenger. In any event, the first and second panels generally aligned, but occupy two different planes, as illustrated by FIG. 8A. For the primary means of egress, the two panels 72, 74 are pushed or slid into their respective wall pocket openings 76, 78.

For a secondary means of egress, the first panel 72 can drop down into the second wall pocket opening 78 or drop to be aligned in side-by-side configuration with panel 74, as illustrated by FIG. 8B. In this configuration, the panels are aligned, such that a passenger could step over the stacked panels to exit.

Figure 9A:
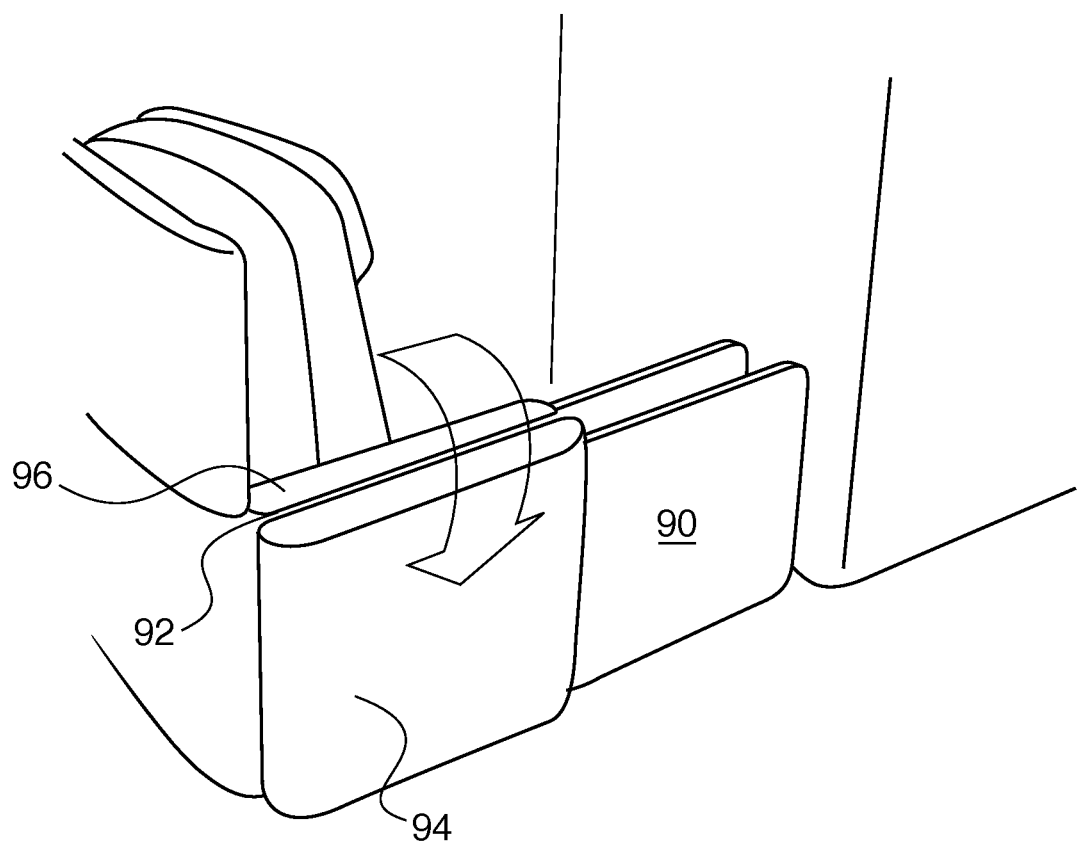
FIG. 9A shows a side perspective view of one embodiment of a mini suite egress system with a folding suite wall.
Figure 9B:
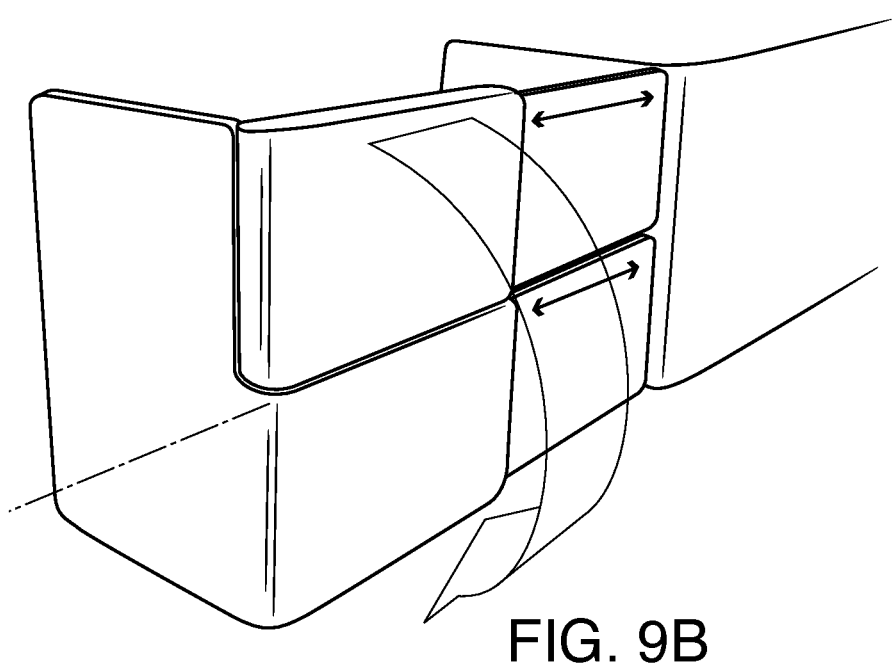
FIG. 9B shows an alternate view of this embodiment, with a double sliding door feature.

FIGS. 9A and 9B illustrates an alternate embodiment in which the upper half 94 of the seat shell 96 (on the aisle side) is mounted on one or more horizontal hinges 92. This allows the upper half 94 to rotate down in order to offer emergency egress to a passenger in the seat in the event of a failed door 90 in the deployed position. This embodiment may be particularly useful in meeting Department of Transportation (DOT) requirements for handicap access. As illustrated, the door 90 may be a double paneled door that slides in regular use. The seat shell 96 may normally be in its raised position (such that the upper half 94 is in a raised configuration alongside the passenger's side). If a secondary emergency egress is required, a lever, trigger, latch, or other release mechanism that maintains the upper half 94 in its raised configuration may be released in order to allow the upper half to rotate about the one or more horizontal hinges 90 two a lowered configuration, side-by-side with the remainder of the seat shell 96.

Figure 10:
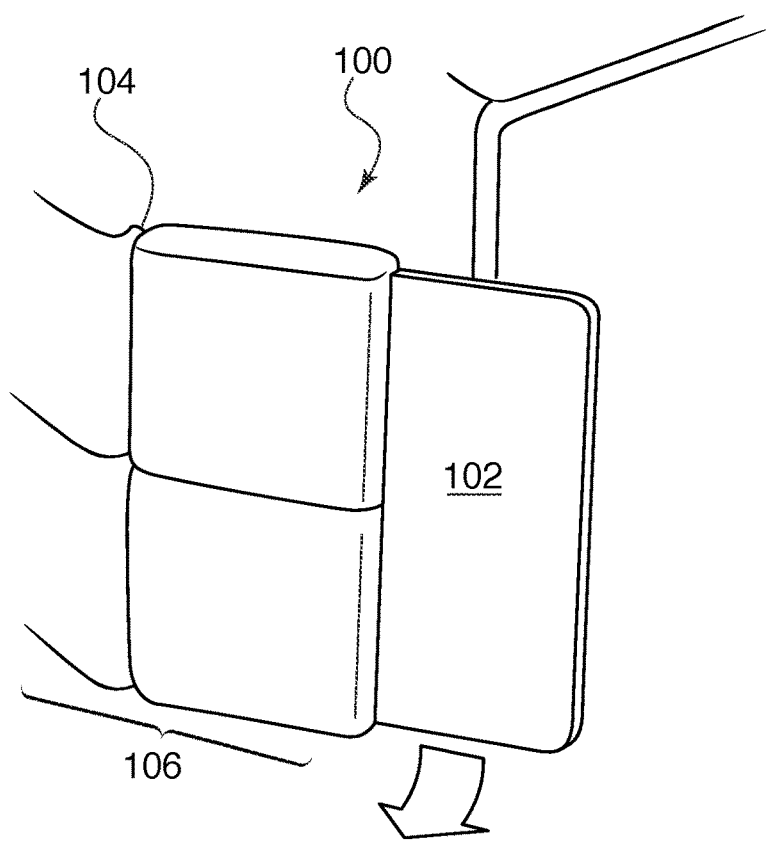
FIG. 10 shows a side perspective view of one embodiment of a mini suite egress system with a combination door.

FIG. 10 illustrates a combination door 100. This combination door 100 provides both a sliding panel 102 and rotation about one or more hinges 104. The combination door 100 actually forms a portion of the shell housing 106. For primary egress, the passenger slides the panel 102 in and out of the pocket contained within the combination door. If the sliding panel 102 becomes lodged or stuck in the deployed position, the passenger may release one or more hinge stops in order to rotate the combination door 100 about one or more hinges 104. The solution creates a large opening and allows full access to the aisle, which can be useful for handicap access. Additionally, it is possible for the combination door 100 to also be a spring-loaded, such that the door 100 closes automatically after passenger egress.

Figure 11:
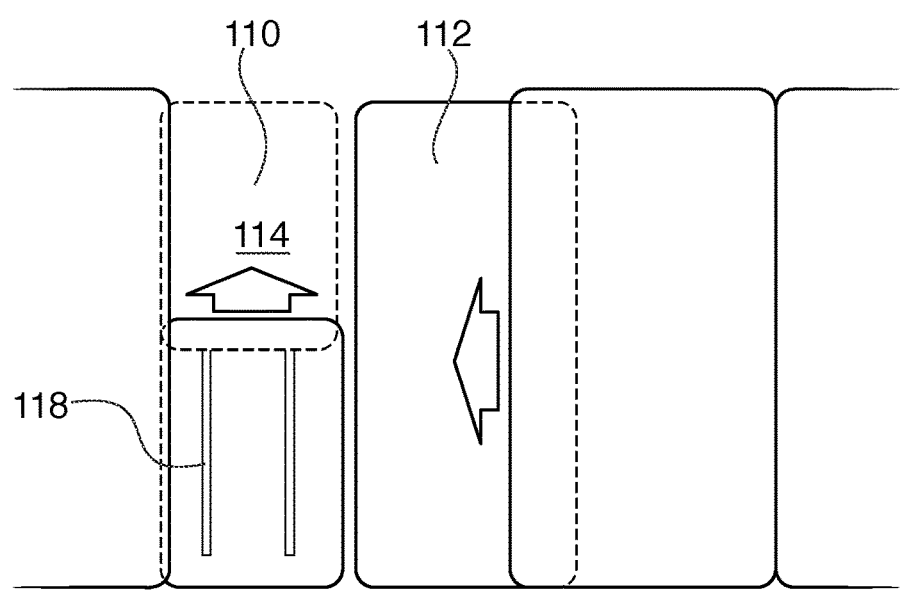
FIG. 11 shows a side perspective view of one embodiment of a mini suite egress system with first and second doors, at least one of which has a vertically movable section.

FIG. 11 illustrates an improvement to a double door system. In one embodiment, both of the doors 110, 112 may be sliding doors (which are the primary means of egress). In another embodiment, only one of the doors 110, 112 is a slidable door and the other of the doors 110, 112 is designed to remain in a deployed/closed position. In theory, it is possible that both doors 110, 112 could become jammed at the same time. Accordingly, at least one of the sliding doors 110 is shown as being provided with an additional vertically moveable section 114. Vertically movable section may cooperate along tracks 118. It is also possible for a vertically movable section 114 to be provided on both of the doors 110, 112. The vertically movable section 114 may be provided as a drop-down section, a hinged section, or any other mechanical feature that allows at least an upper portion of the door to be lowered. When both doors 110, 112 are deployed, the passenger is provided with a privacy screen. However, if one of the doors 110, 112 were to fail, the other of the doors 110, 112 may be used for egress. Accordingly, in a specific example, if the vertically movable section 114 is provided on door 110, and if door 112 is provided as a sliding door, if either of the doors 110 or 112 becomes stuck in its deployed/closed position, the other of the doors 110 or 112 may be used for egress. The two different kinematic movements react differently to the same abuse load, which should prevent both doors 110, 112 from failing at the same time.

Figure 12A:
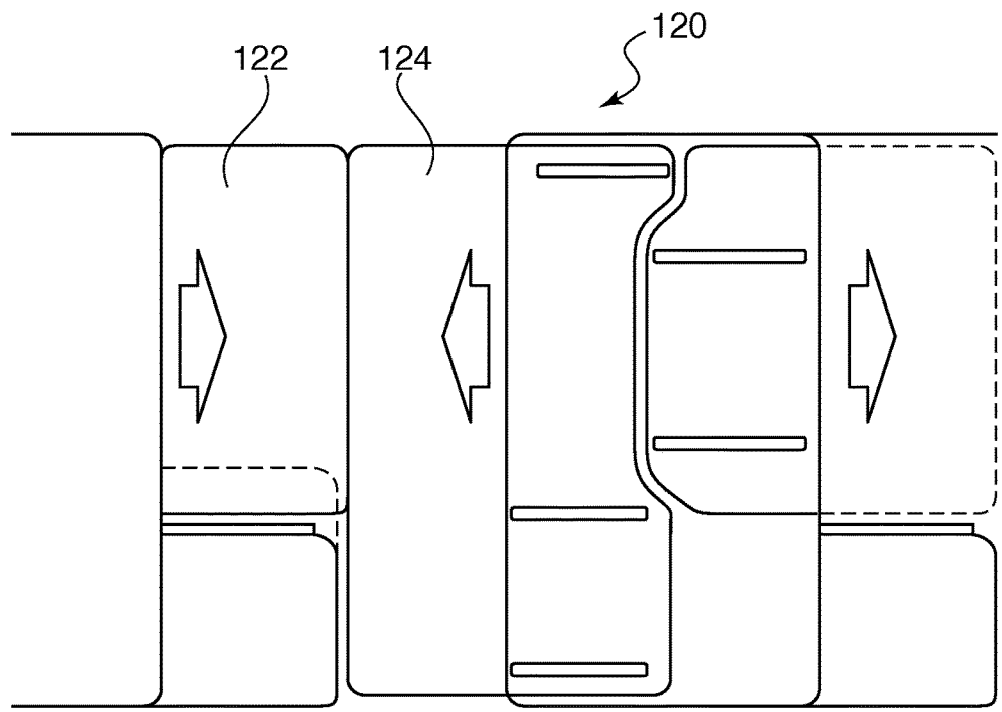
FIG. 12A shows a side perspective view of one embodiment of a mini suite egress system with a sliding doors.
Figure 12B:
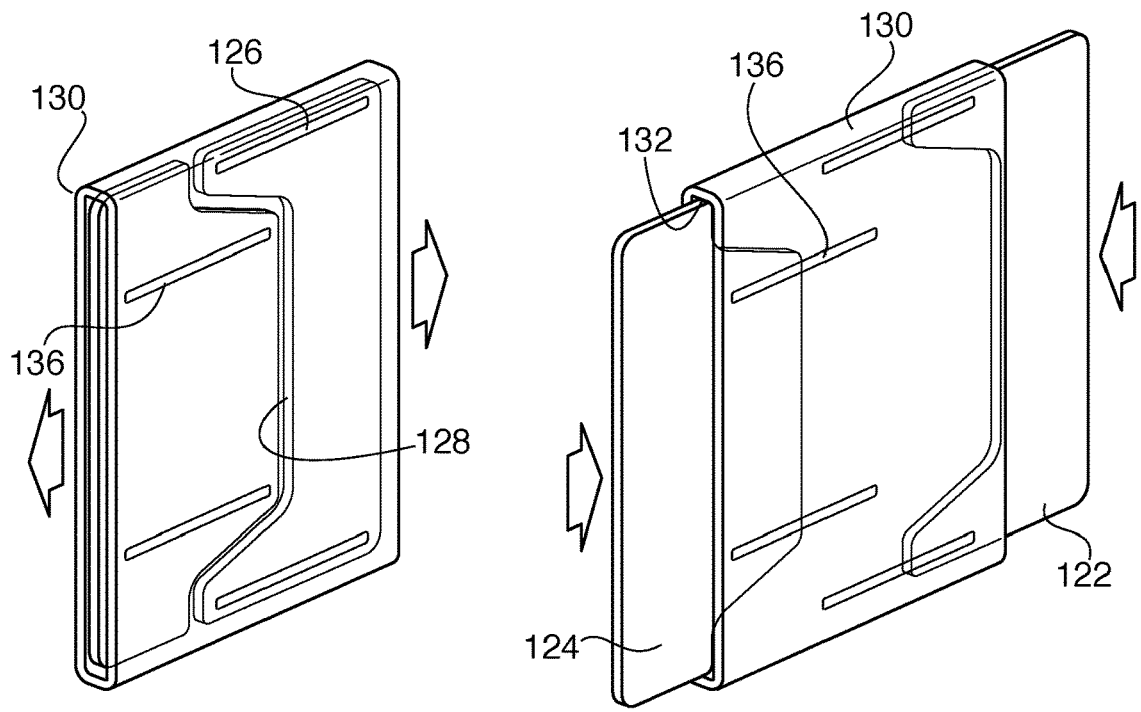
FIG. 12B shows a side perspective view of a stow feature that receives the sliding doors of FIG. 12A.
Figure 12C:
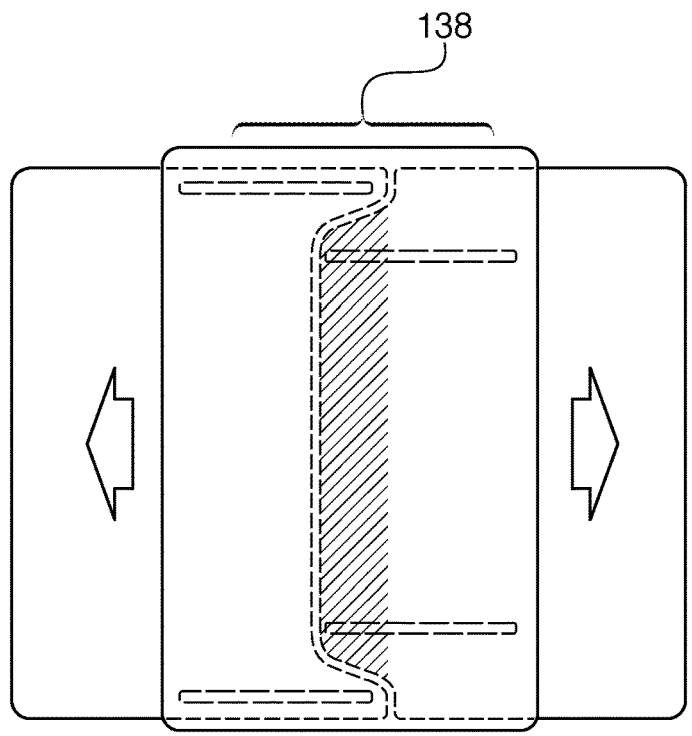
FIG. 12C shows a side plan view of the stow feature of FIG. 12B, with both panels housed with an overlapping section.

FIGS. 12A-12C illustrate a dual privacy door system 120. In this example, the system has two sliding panels 122, 124, one of which slides forward (122) and one of which slides backward (124) with respect to the aircraft axis. One of the panels will generally be attached to the seat shell of the seat for which it provides privacy and the other of the panels may be attached to the seat shell of a forward or aft seat. These attachments may be external, such that the panels slide alongside the shell. In other examples, these attachments may be designed so that the panels are received by internal wall pockets. When deployed, the panels 122, 124 meet to create a fully enclosed passenger space.

As illustrated, in order to manage space considerations when the panels are stowed (e.g., in the open, non-privacy position), it is possible to provide varying panel shapes. The shapes may be provided such that a tab-shaped area 126 provided on one panel is received by a receiving space 128 of another panel. The panels 122 and 124 may have differing heights and widths. The panels may also run along offset rails 134 and tracks 136, more detail for which is described below.

It is also possible to provide a stow feature 130, as illustrated by FIG. 12B. The stow feature 130 may function as an endbay to house the panels. In one example, the stow feature 130 may be formed with an internal pocket 132 that receives both sliding panels 122, 124. In the example shown, sliding panel 124 has a tab-shaped area 126 that is received by a receiving space 128 of sliding panel 122. Both panels may safely nest within the stow feature 130 when not in privacy screen use. It is also possible to provide a sliding management system for use in cooperation with the stow feature 130 and the panels. In one example, one or more rails 134 on the panels 122, 124 cooperate with one or more receiving tracks 136 of the stow feature 130. It should be understood, however, that the track(s) may be provided on the panel(s) and the rail(s) may be provided stow feature. The sliding management system generally has these features being staggered so that the doors can be overlapped when stowed. This can help reduce the overall size of the stow feature/endbay. It is possible for the stow feature 130 itself to provide a pivoting function in order to allow a greater access to the passenger space. This may provide beneficial for cabin crew assisting a handicapped passenger.

As illustrated by FIG. 12C, it is possible for the sliding doors to overlap one another. In this embodiment, the doors may be slightly offset in the Y axis so that they define an overlapping area 138 when both doors are stowed. This can help save space and increase available privacy range.

Figure 13:
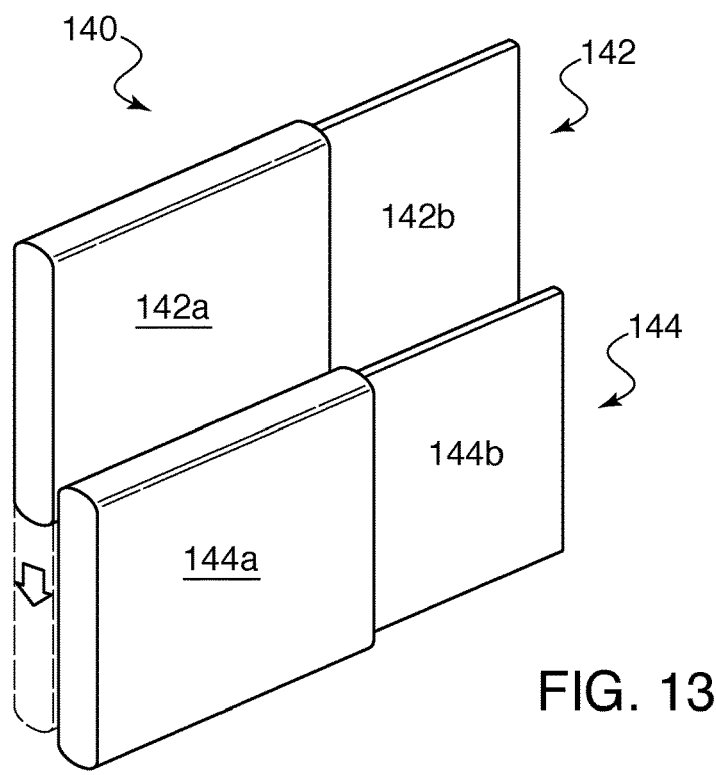
FIG. 13 shows a side perspective view of one embodiment of a mini suite egress system with a double drop down door.

FIG. 13 illustrates an embodiment similar to the embodiments shown by FIGS. 7, 8A, and 8B. In FIG. 13, the privacy wall 140 is formed by a pair of upper panels 142 and a pair of lower panels 144. The upper panels 142 and lower panels 144 can be secured in order to move collectively as a solid planar panel (albeit offset). In this configuration, it is possible for there to be a pin or track or other securement feature that maintains the upper panels 142 above the lower panels 144. Alternatively, the panels 142, 144 can be deployed separately, such that one or more of the upper panels 142 may be extended completely across the space, or may be extended only partially across the space, depending upon the amount of privacy desired by the passenger.

When in a deployed configuration, the upper panels 142 will generally abut the lower panels 144 in an end-to-end configuration. The panels 142, 144 are generally aligned, but occupy two different planes, as illustrated by FIG. 13. For the primary means of egress, the panels 142, 144 are pushed or slid into respective wall pocket openings. When a secondary egress is needed, it is possible for the upper panels 142a and 142b to drop into an internal pocket of the lower panels 144, as discussed in connection with FIG. 7. It is also possible for the upper panels 142 to drop alongside the lower panels 144. When dropped, the upper panels 142a and 142b may be received alongside the lower panels 144a and 144b in a stacked, side-by-side configuration.

Figure 14:
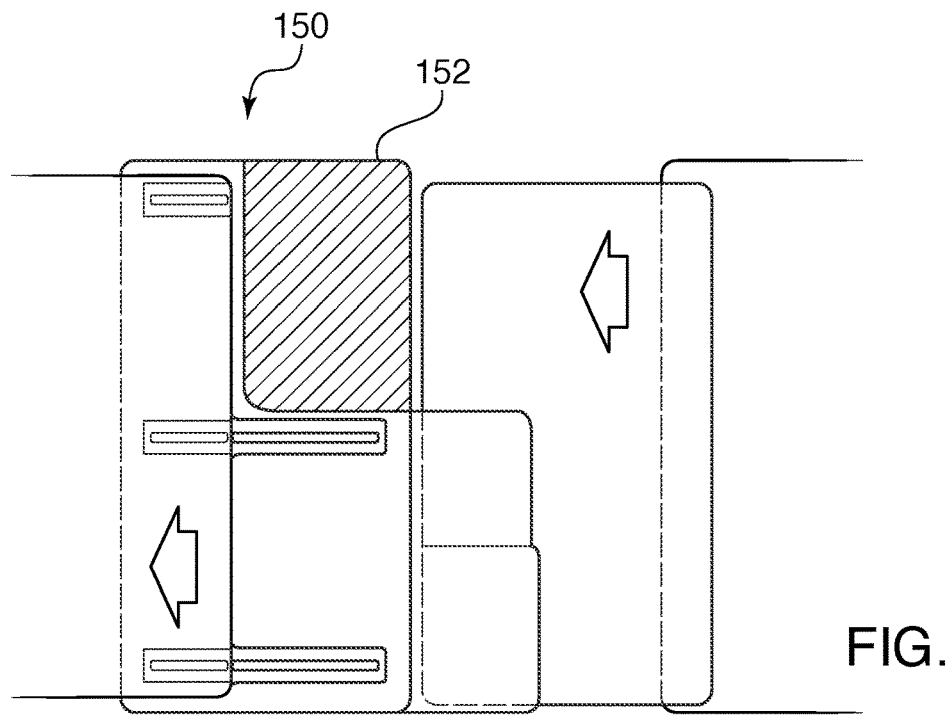
FIG. 14 shows a side plan view of one embodiment of a mini suite egress system with a removable panel.

FIG. 14 illustrates one example of a door 150 having a removable panel 152. In a specific embodiment, the door 150 is a backward sliding hinged door with a removable panel 152. The door 150 may have tracks that slide along one or more rails in order to provide a smooth and controlled movement. In one example, the removable panel 152 may be a frangible panel that can be removed via a certain force. The removable panel 152 may have an area of weakness that allows its removal.

Figure 15A:
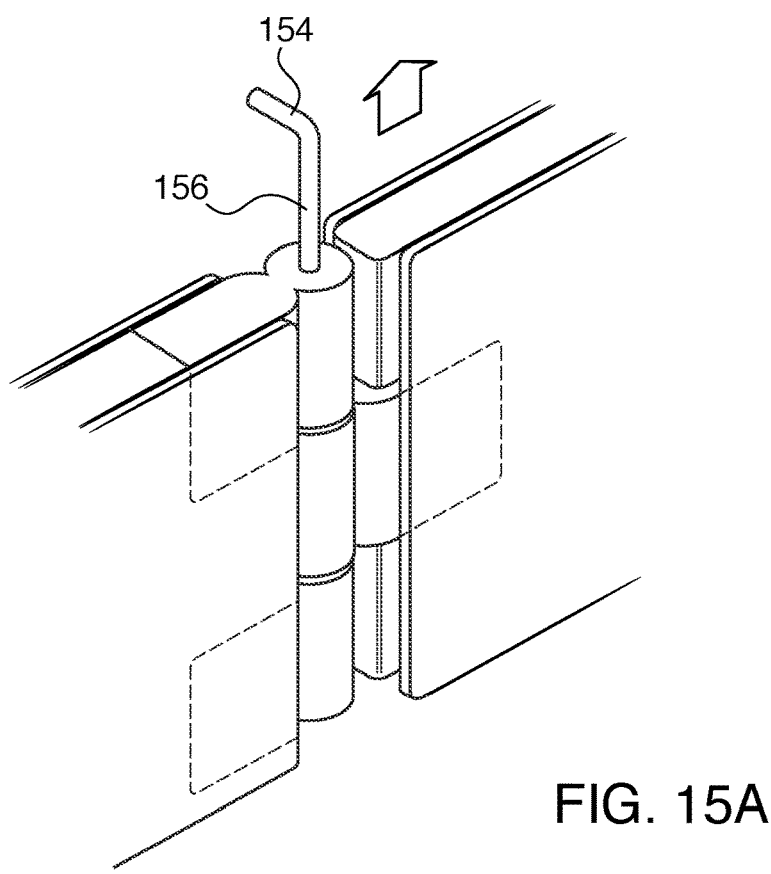
FIG. 15A shows a side perspective view of one embodiment of a hinge.
Figure 15B:
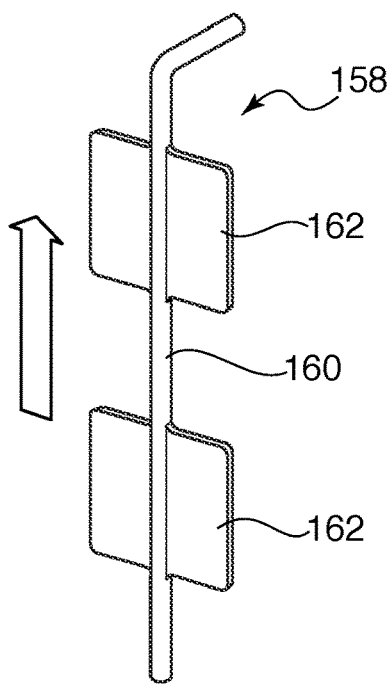
FIG. 15B shows a side perspective view of an alternate hinge.

In one example as illustrated by FIG. 15A, the removable panel 152 may be secured via a disengageable hinge axis 154. The hinge axis 154 may be secured via a pull pin 156. Once released, the pull pin 156 can allow release of the removable panel 152. In another example, a further example is to use bi-stable hinges that create a solid panel that can have an area released. One example of such a hinge 158 is illustrated by FIG. 15B. Such a hinge 158 may interface between the door 150 and the removable panel 152. The hinge 158 may have a spine 160 that supports one or more flat edges 162. The spine 160 may be rounded in order to allow hinge rotation for the door to open or fold. In use, the flat edges 162 lie against one or more indentations in the door 150 and keep the removable panel 152 in place and rigid with respect to the door 150. When the hinge 158 is raised as indicated by the arrow, the door is allowed to rotate and/or the removable panel 152 is allowed to release. An even further solution is to use a two-position hinge that allows rigidity or flexibility, depending on the position of the part.

Although the above and below described securement and release mechanisms or triggers may be used with the releasable or breakaway door embodiments disclosed, it should be understood that it is possible for these features to be used with any of the egress systems described and shown anywhere herein.

Figure 16A:
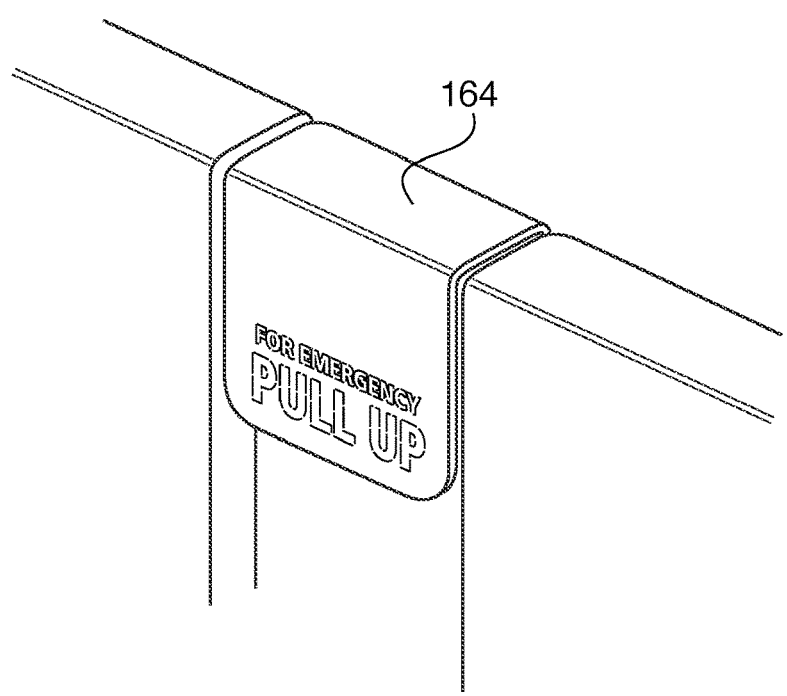
FIG. 16A shows a side perspective view of one example of a releasable securement member.
Figure 16B:
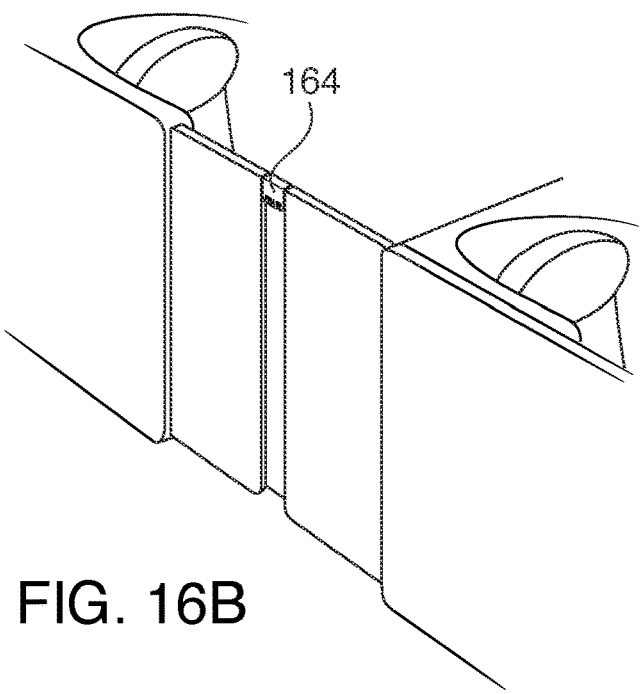
FIG. 16B shows a side perspective view of the releasable securement member of FIG. 16A in place on doors.

FIG. 16A illustrates a releasable securement member 164 that may be placed over any of the hinges described. The releasable securement member 164 that allows the door or panel to stay straight and rigid in use but can be released to allow the rigid connection to be released. In one example, the releasable securement member 164 may secure two independently movable doors or panels. In another example, the releasable securement member 164 may be used to secure a hinge point to prevent rotation until desired. In another example, the releasable securement member 164 may secure a breakaway or removable panel onto a door or other structure. FIG. 16B illustrates the releasable securement member 164 in position between two doors. The doors may be separately slidable doors, hinged doors, or any of the door embodiments described herein. When the doors are to be separated, the releasable securement member 164 may either be removed completely or may flip open or lift up in order to release the door(s) and/or panel(s) to allow movement.

Figure 16C:
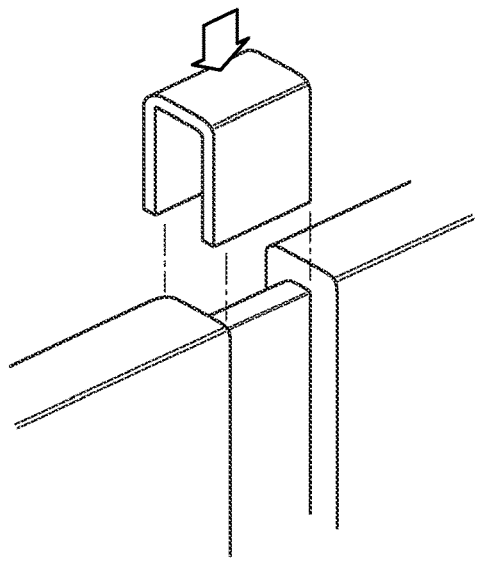
FIG. 16C shows a side perspective view of the releasable securement member in use.
Figure 16D:
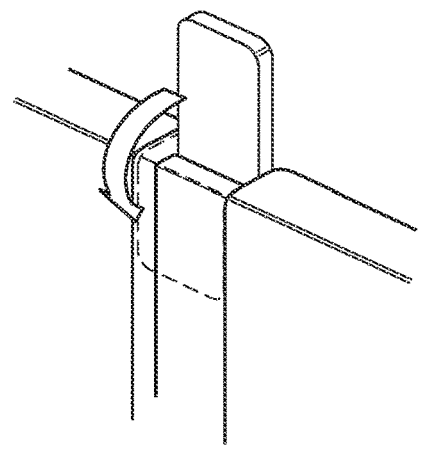
FIG. 16D shows a side perspective view of an alternate releasable securement member in use.
Figure 17A:
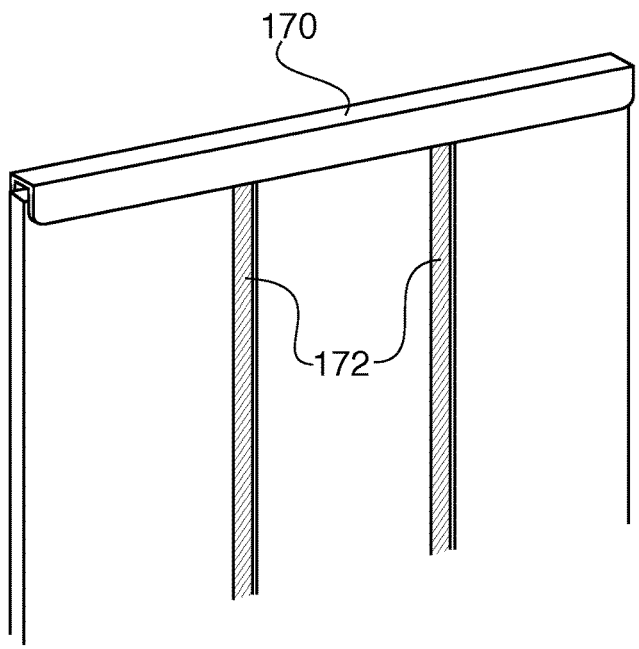
FIG. 17A shows a side perspective view of an elongated releasable securement member.
Figure 17B:
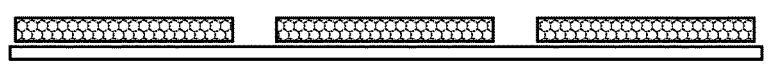
FIG. 17B shows a top plan view of a releasable securement member securing three panels in place.
Figure 17C:
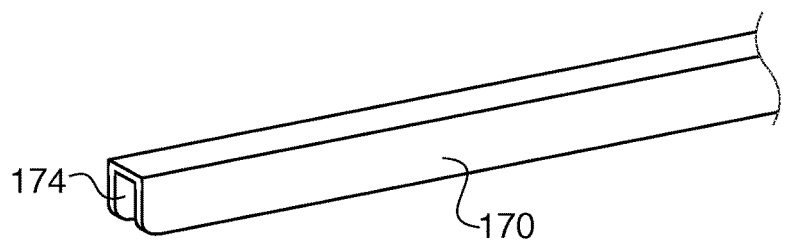
FIG. 17C shows a side perspective view of an elongated releasable securement member with a channel.

These examples are illustrated by FIGS. 16C and 16D. FIG. 17A illustrates an alternate embodiment of an elongated releasable securement member 170. The elongated releasable securement member 170 may be an extended version of the releasable securement member 164, such that it spans more than one hinge area 172 between a plurality of doors. FIG. 17B illustrates three independent flat panels secured into a single panel via an elongated rubber panel that allows rotation of the panels. The intermediate rubber connection are flexible and function like a hinge.

The releasable securement member 164 and the elongated releasable securement member 170 may have an internal channel 174 that can be received over an upper door or panel surface. The members 164, 170 function as top caps to be positioned over the upper part of the door/panel. The top cap runs along a top edge of the door in order to give the door rigidity, but that can be removed. When the member 164 or 170 is removed, the doors revert back to their hinged or removable functionality. The releasable securement member 164 or 170 can be removed in case of emergency to rotate the door and create an emergency passage feature and/or to remove a panel that allows emergency egress.

Figure 18A:
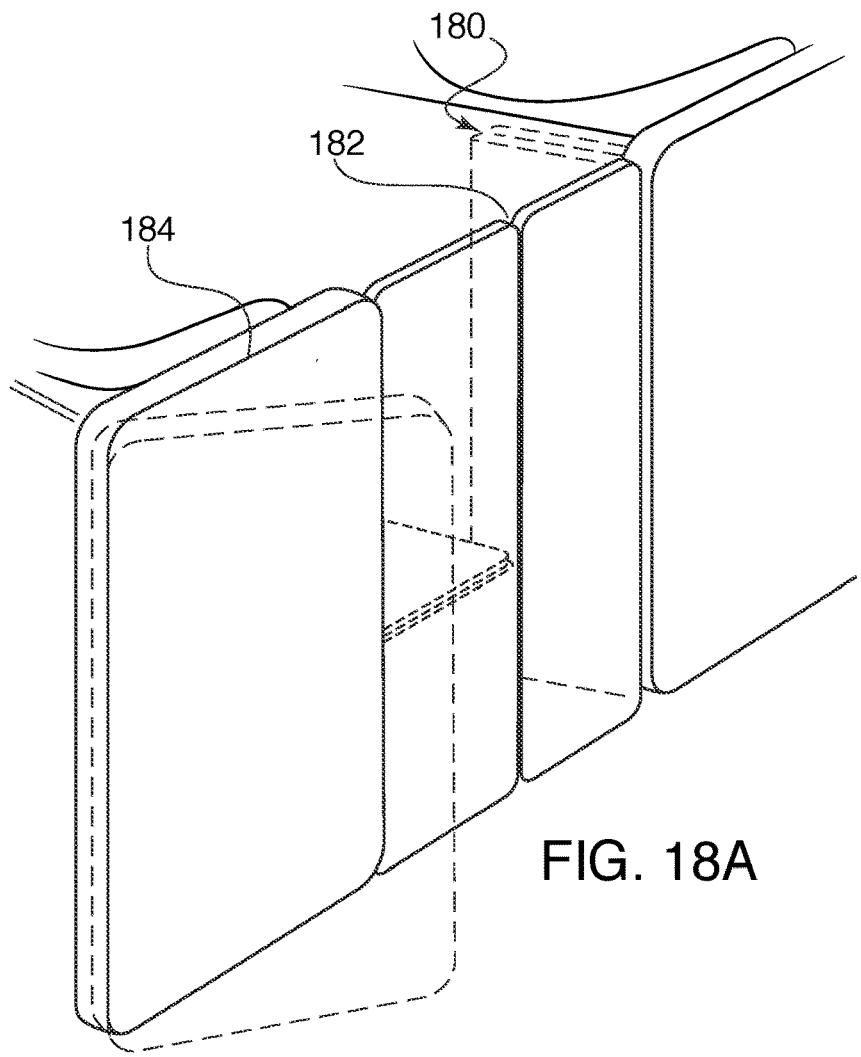
FIG. 18A shows a side perspective view of one embodiment of a mini suite egress system with a folding accordion door and a rotating assembly of the seat shell.
Figure 18B:
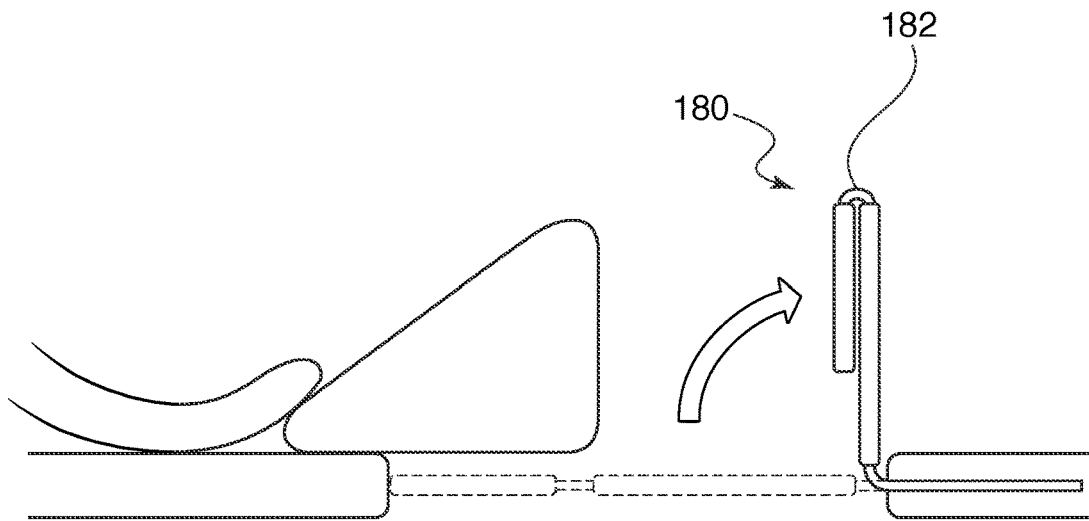
FIG. 18B shows a top plan view of the system of FIG. 18A.

FIGS. 18A and 18B illustrate an embodiment that provides a sliding hinged door 180. The sliding hinged door 180 when may be used in connection with a seat shell having rotation capability. The primary means of egress is sliding of the door 180 into a wall pocket, as described in alternate embodiments above. The secondary means of egress is provided by folding the door back upon itself lavatory-style and/or rotation of a portion of the seat shell. As illustrated, the door 180 incorporates one or more vertical hinges 182 that can allow backward folding of the door 180. It is generally envisioned that one or more of latches or securement member as described above and herein may be used in order to maintain the door as a solid panel. If the secondary means of egress is necessary, the latch or securement member is released to allow folding capability. Additionally or alternatively, if handicap access is necessary, the endbay or end wall 184 of the privacy shell may be rotatable in order to offer an even larger amount of access for passengers.

Figure 19A:
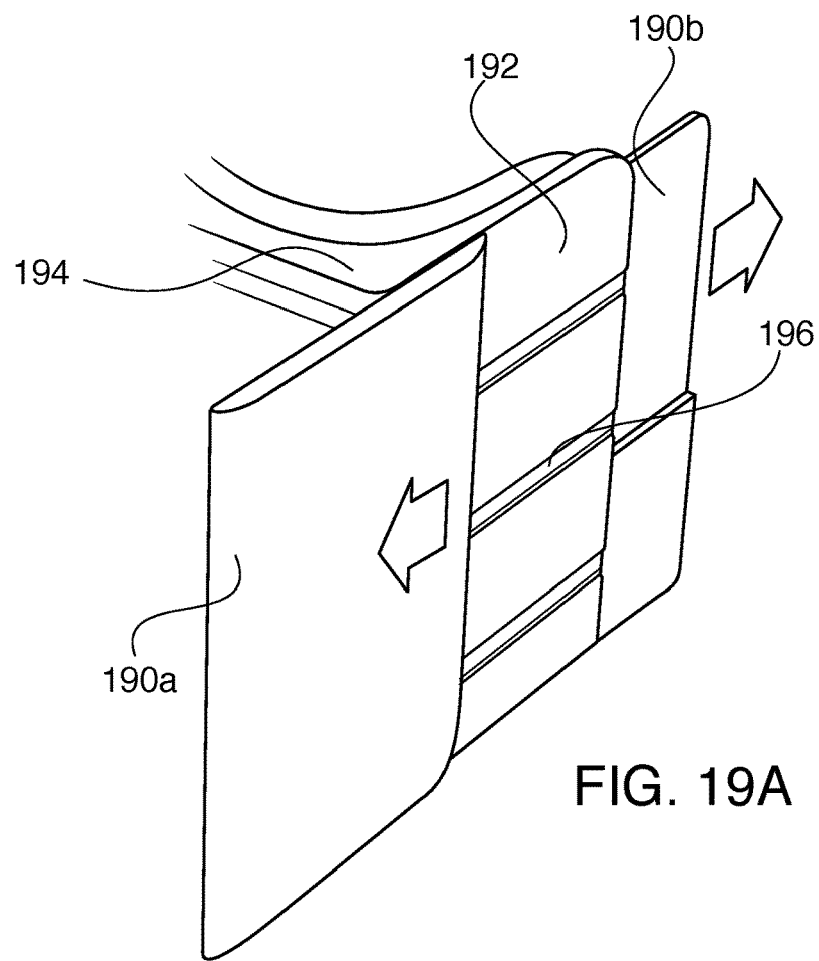
FIG. 19A shows a side perspective view of one embodiment of a mini suite egress system with dual sliding doors.
Figure 19B:
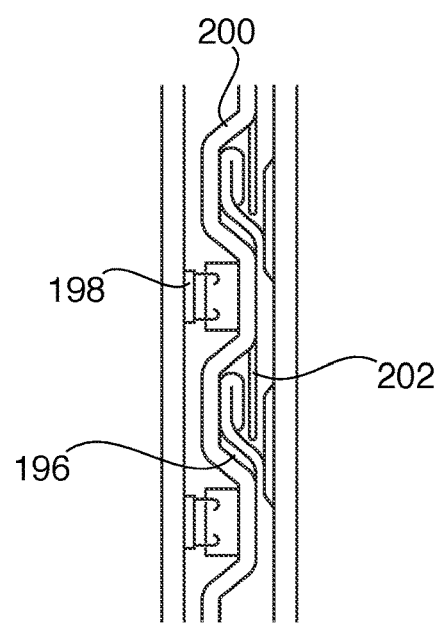
FIG. 19B shows a side cross-sectional view of the dual sliding door system of FIG. 19A.

FIGS. 19A and 19B illustrate an embodiment with dual sliding privacy doors 190. The privacy doors 190 are secured to the same structure and slide in opposite directions. As illustrated by FIG. 19A, the external door 190*a* is sliding rearwardly and the internal door 190*b* (closer to the seat) is sliding forward. In this example, the endbay 192 (a portion forming or secured to an aisle-side of a passenger seat or shell 194) is the portion supporting the doors 190. The endbay 192 includes one or more door supporting features 196. Each of the dual sliding doors 190 includes one or more endbay cooperating features 198. In a specific example, the features 196 may be internal tracks or grooves, and the features 198 may be sliders, track portions, or rollers. As illustrated by the cross-sectional view of FIG. 19B, the one or more door supporting features 196 may define an S-shaped slider support 200. Both doors 190 are secured to the S-shaped slider support 200. The slider support 200 receives features 198 of the doors 190. It is also possible to provide one or more covers 202 that extend down over the door supporting features 196. This can help protect the features 196 from passenger tampering, as well as debris. The presence of covers 202 may also help maintain securement of the endbay cooperating features 198 within the support 200.

The support 200 may be shaped such that its connection features 196 are overlapped in the Z and Y axes. This allows the endbay 192 to receive endbay cooperating features 198 of the first door 190*a* on a first side and endbay cooperating features 198 of the second door 190*b* on a second side. Without this feature, attaching full-size doors in a back-to-back configuration on the same panel could take up extraneous passenger living space. By using an S-shaped structure 200 on which rails from both doors are attached alternatively on the side, it is possible to reduce thickness while still offering an extended privacy range.

Figure 20A:
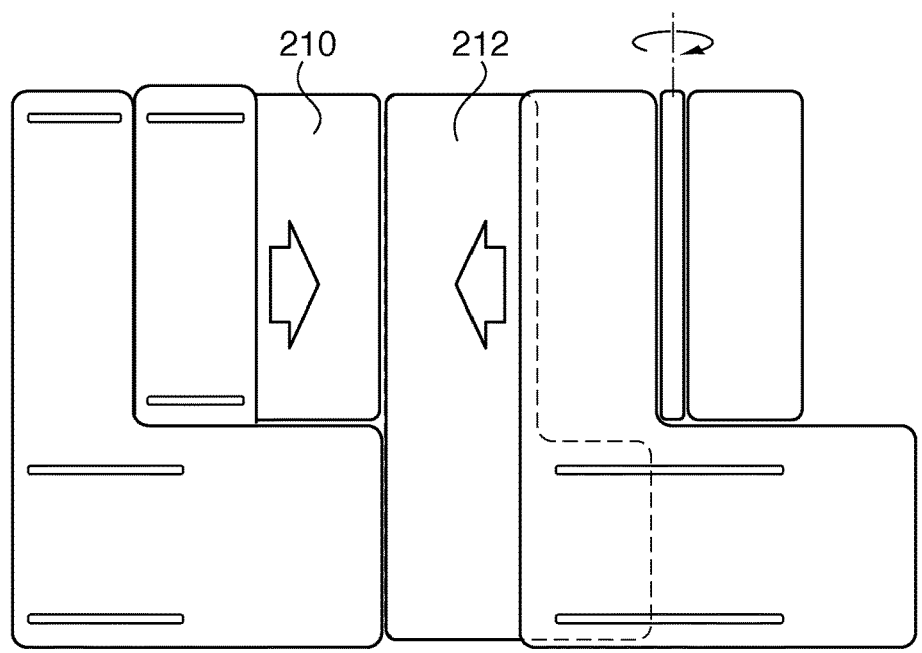
FIG. 20A shows a side plan view of one embodiment of a mini suite egress system with forward and rear sliding doors, with one of the doors designed as being hinged or as a folding accordion door.
Figure 20B:
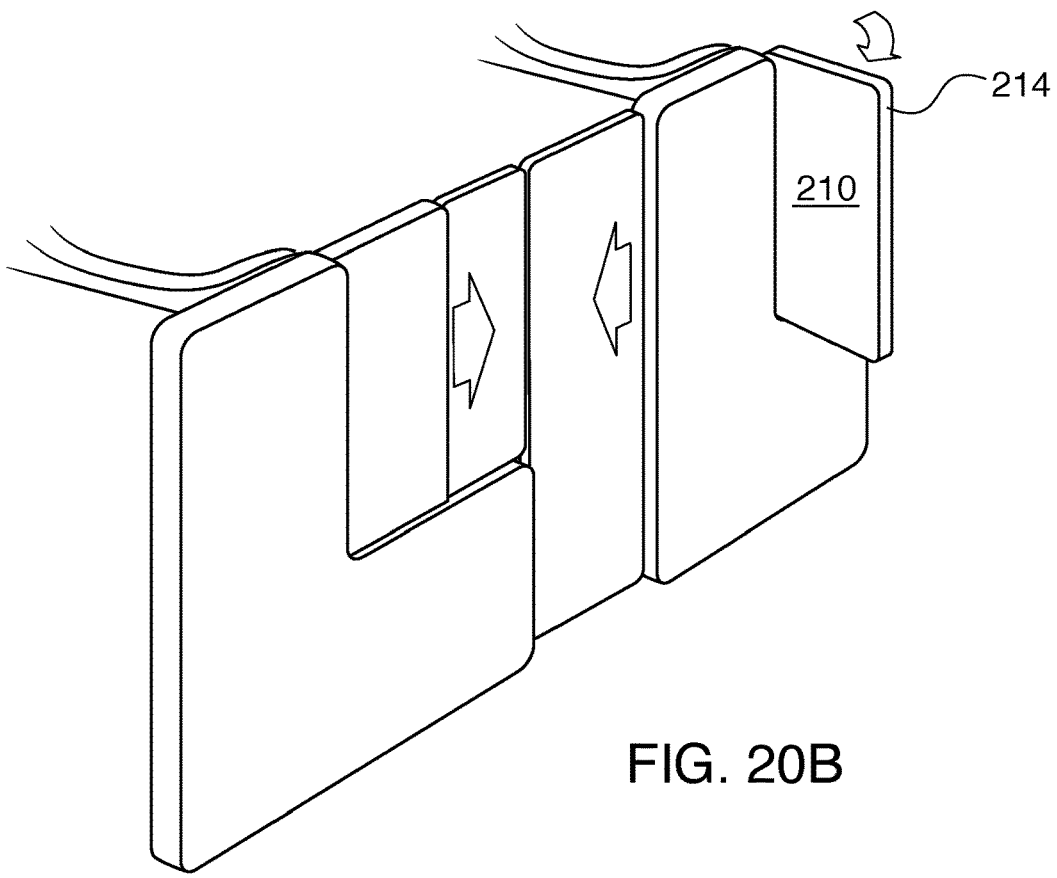
FIG. 20B shows a side perspective view of the system of FIG. 20A.

FIGS. 20A and 20B illustrate an alternate embodiment with dual sliding doors that have a rotating feature. In this embodiment, a passenger seat area is provided with one forward sliding door 210 and privacy is completed via a rearward sliding door 212 from the seat immediately forward. (Accordingly, each passenger seat is provided with both a forward sliding door 210 for its own passenger and a rearward sliding door 212 for the passenger behind.) Although the forward sliding door 210 is illustrated as being a half height (or shorter height) door, any size or height is possible and considered within the scope of this disclosure.

The primary means of egress from the passenger space is sliding the doors forward and rearward. Although it is unlikely that both doors we become stuck in the deployed position, a secondary means of egress is to provide one or both doors as having a rotating feature. In the example illustrated, the forward sliding door 210 is provided with a hinge area 214 that allows the door to hinge upon itself and/or hinge open. In one example, the door may hinge and swivel closed upon itself similar to the lavatory-style closure described above. In another example, the door may have a rigid hinge that is released for folding. Any of the hinged movement described herein and/or any of the latch, pin, or releasable securement members may be used to maintain the rigid position of the rotating door when rotation is not necessary. Any of the other hinging options described herein are possible and considered within the scope of this embodiment disclosure. In any event, hinged movement may be outward, inward, or both options may be provided.

Figure 21:
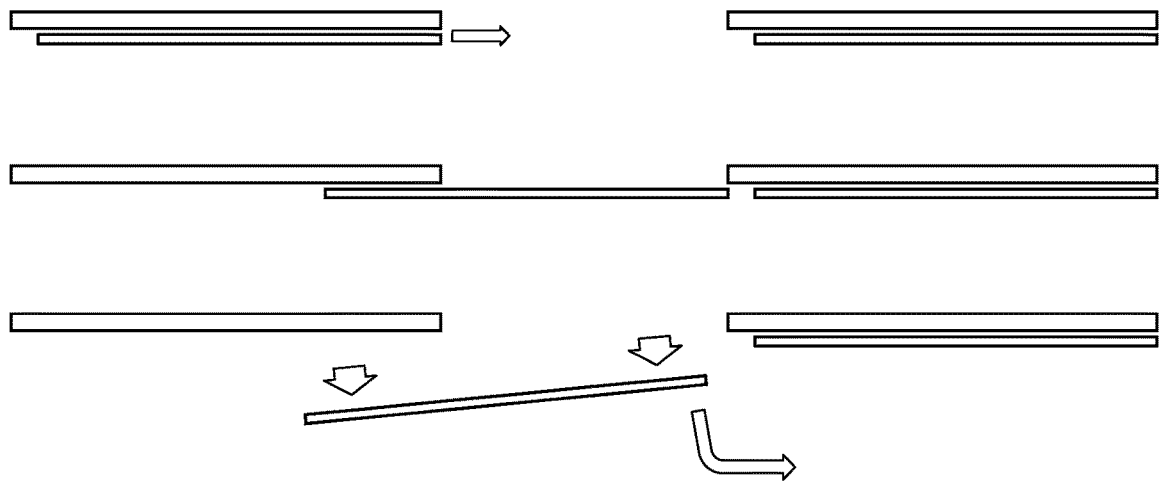
FIG. 21 shows a top plan view schematic of a fully this engageable and removable door system.

Other embodiments provide a complete breakaway door. The door may be completely disengaged from the privacy shell, endbay, or other supporting feature. In some examples, the door is completely freed and stowed within the mini suite passenger space during emergency exit. In other examples, the door is designed to slide down and/or back into the supporting feature. FIG. 21 illustrates one embodiment in which the door is completely disengaged from the supporting structure. Engagement and disengagement may take place via a pin securement, cam securement, via links, spring loaded removable features, a self-latching feature, roller balls or sliders, releasable clamps, or any other feature that can allow a door to be removed from its housing.

Figure 22:
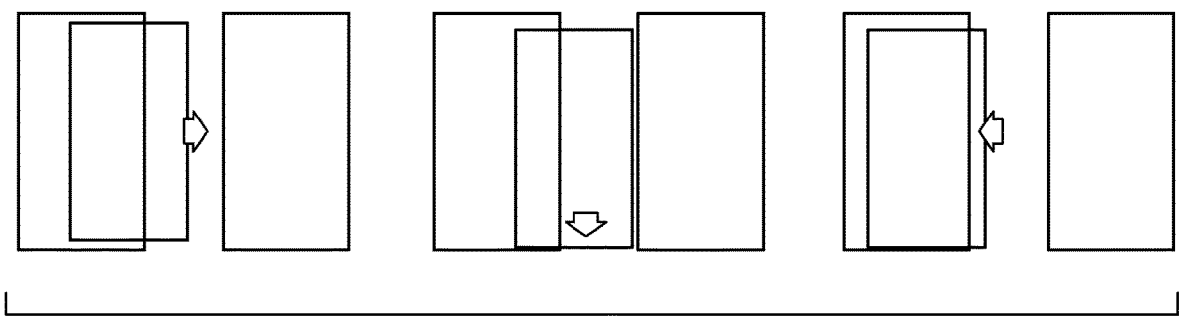
FIG. 22 shows a side plan view schematic of a disengageable door that slides back into it housing.
Figure 23A:
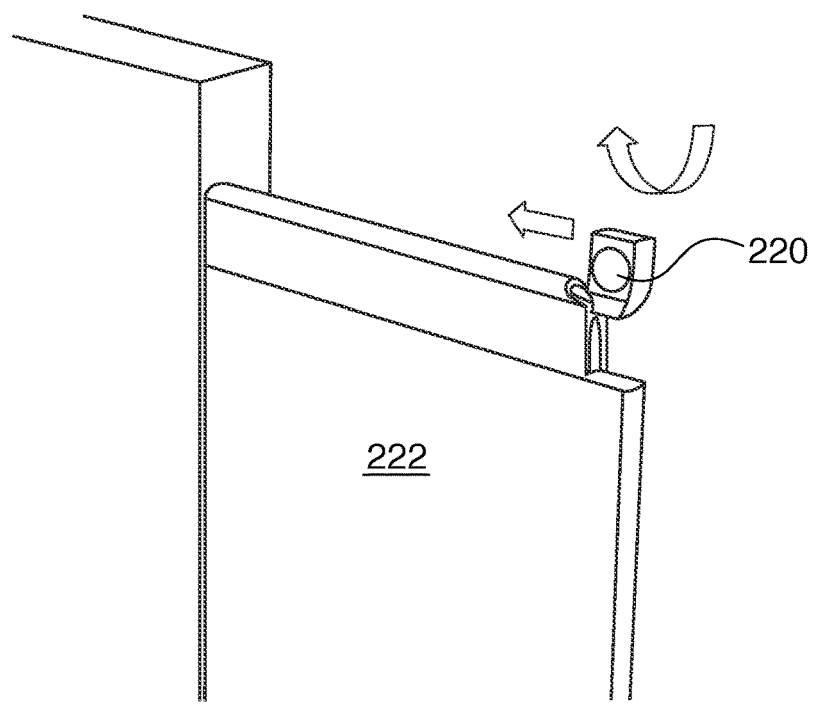
FIG. 23A shows a side perspective view of one embodiment of a release mechanism for a disengageable door.
Figure 23B:
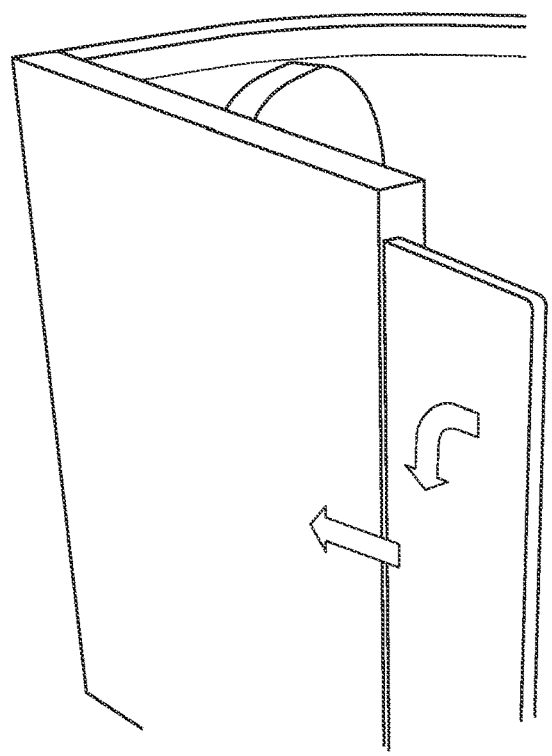
FIG. 23B shows a side perspective view of the door of FIG. 23A being moved back into its housing.

FIG. 22 illustrates an embodiment in which the door is disengaged from the supporting structure, and slid or pushed back into a wall pocket. As shown in FIG. 23, a release mechanism 220 may be provided. When released, the door 222 is disengaged from its internal track system and allowed to drop or otherwise release via gravity.

Figure 24A:
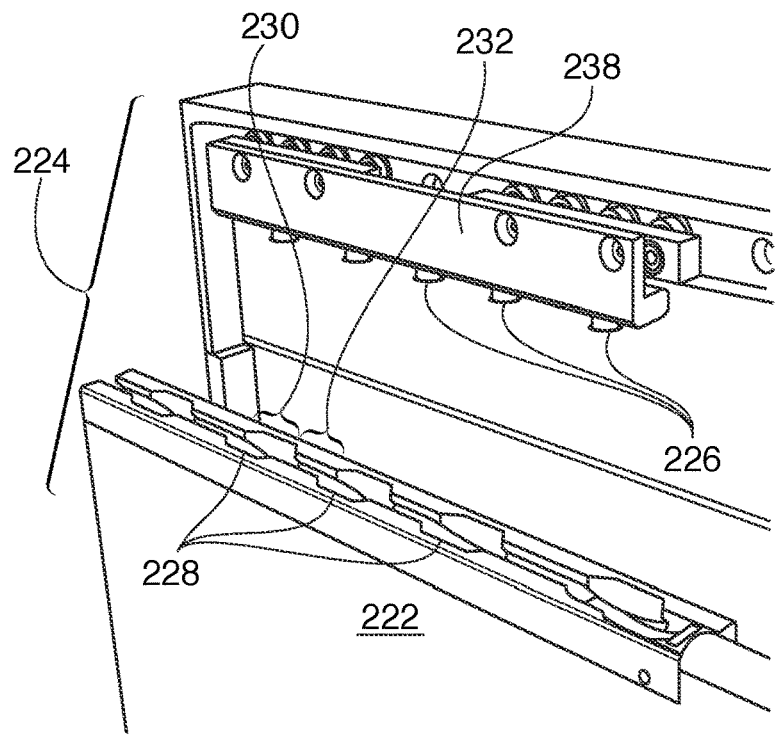
FIG. 24A shows a side perspective view of one embodiment of a release mechanism that may be used with a disengageable door.
Figure 24B:
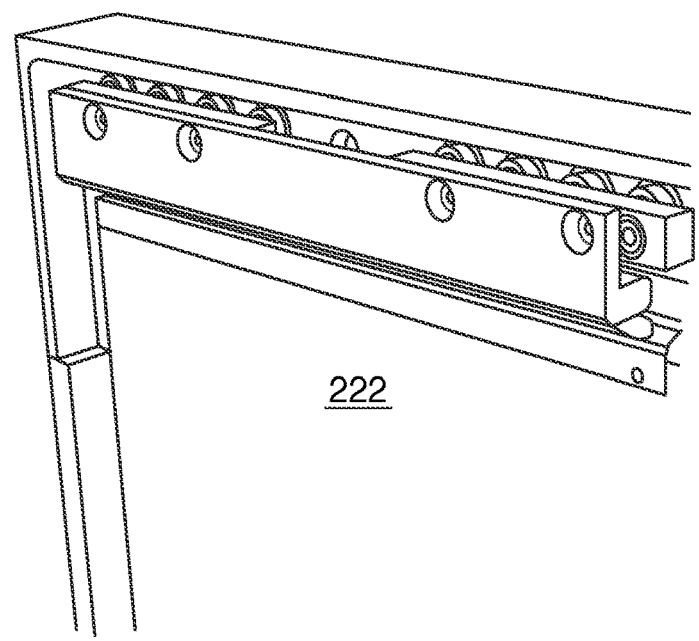
FIG. 24B shows a side perspective view of a track base in position with respect to a housing.
Figure 24C:
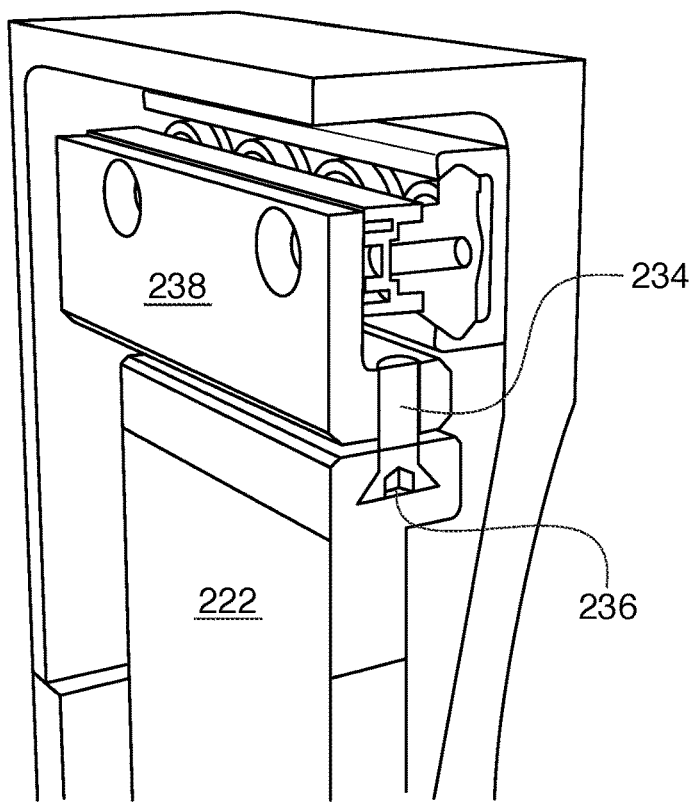
FIG. 24C shows a side cross-sectional view of cooperation between a door and housing.
Figure 24D:
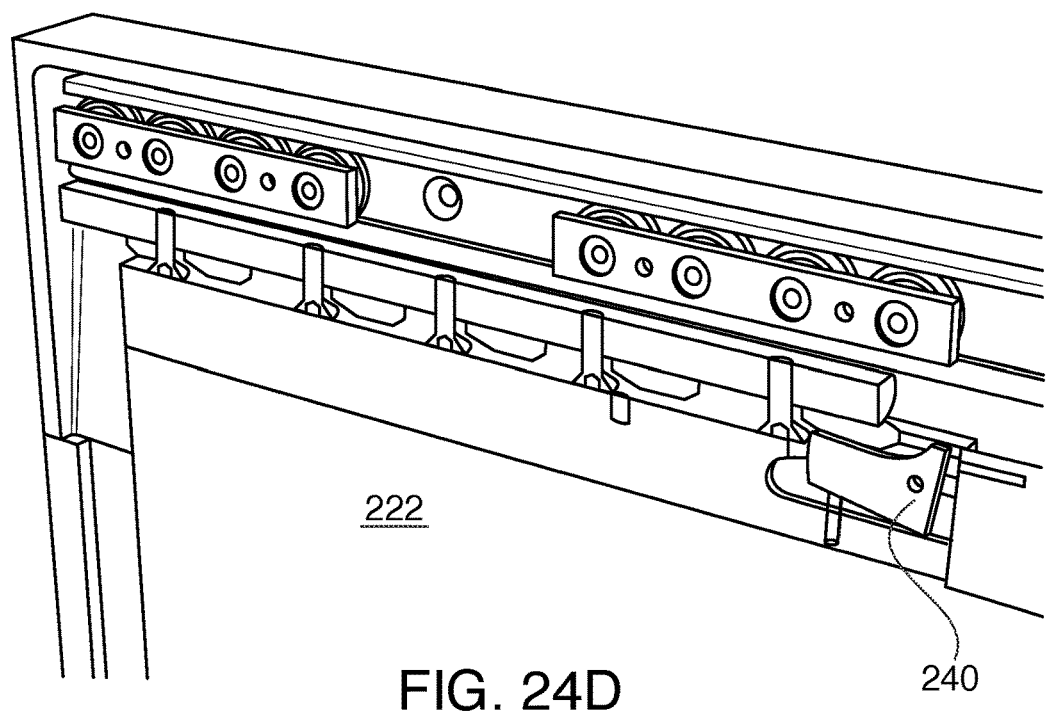
FIG. 24D shows a side perspective view of a release system that allows release of the door from the housing.
Figure 24E:
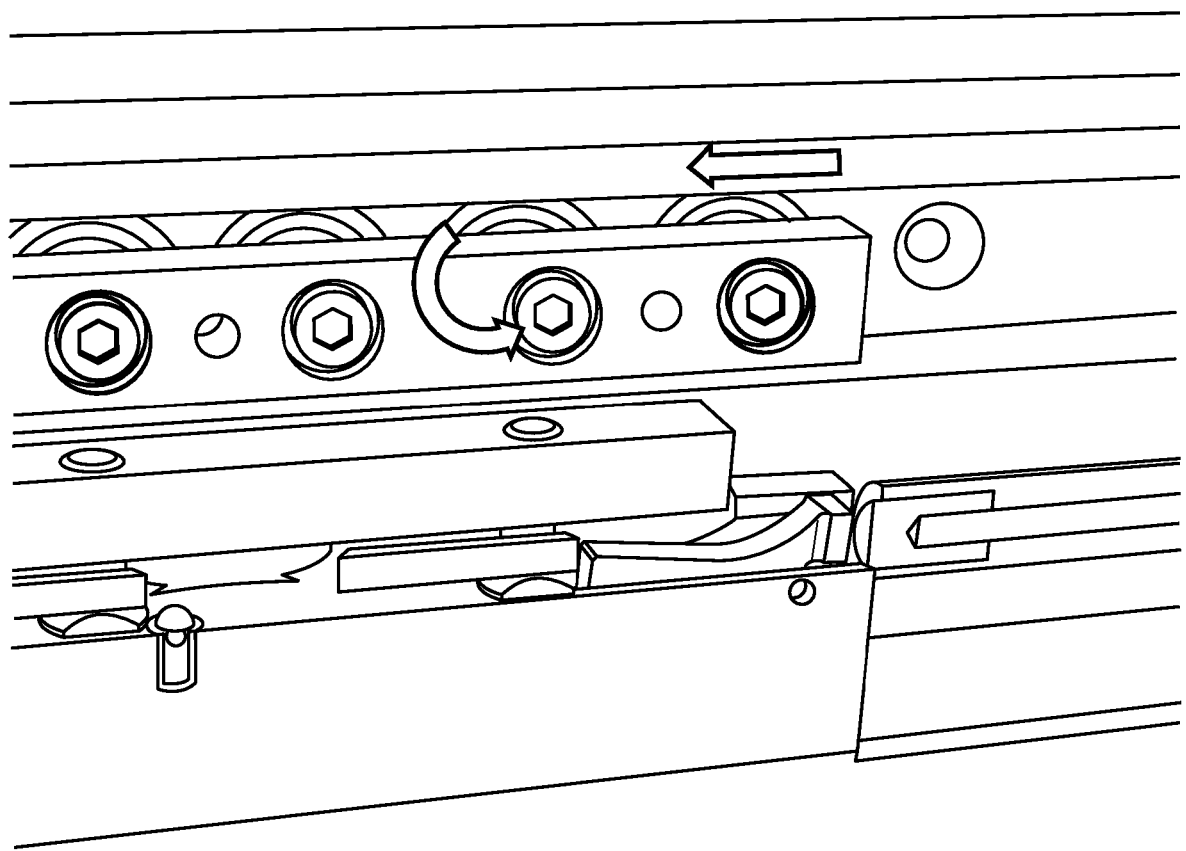
FIG. 24E shows a side perspective view of the release system of FIG. 24D.

FIGS. 24A-24E illustrate one embodiment of a track system 224 that may be used. The track system 224 includes a track base 238 supporting one or more protrusions 226 that are shaped and configured to cooperate with one or more receiving portions 228 on an upper portion of the door 222. In the illustration shown, the protrusions are shaped as wide-headed pegs 234. The receiving portions are shaped as elongated slots 230 with narrowed portions 232 therebetween. Running below the elongated slots 230 and the narrowed portions 232 is a channel 236. In order to secure the door 222 to the protrusions 226, the door 222 is aligned with the track base channel 236 and wide-headed pegs 234 are received into the channel 236, as illustrated by FIG. 24C. The door 222 is allowed to slide along the track system 224 in regular use.

If, however, the door becomes jammed in its open/deployed position, a release system 240 may be activated to disengage the pegs 234 from the channel 236.

Figure 25A:
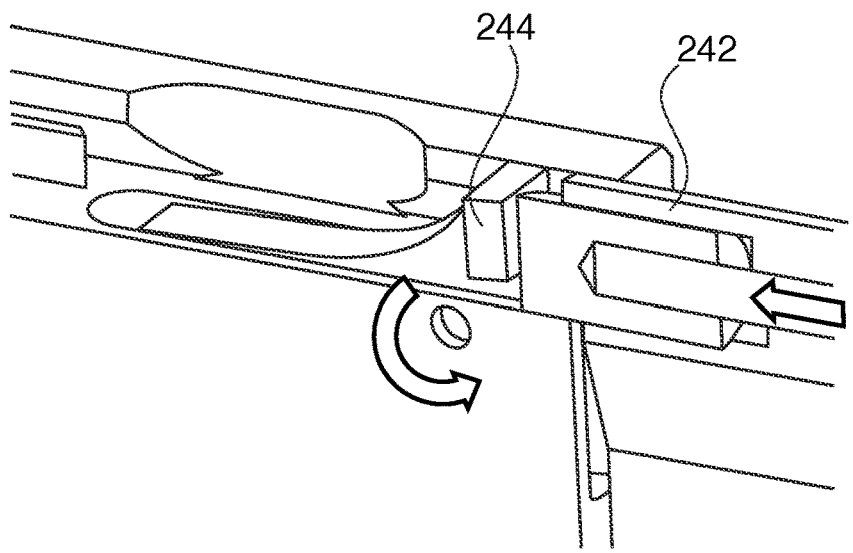
FIG. 25A shows a side perspective view of one embodiment of a release system.
Figure 25B:
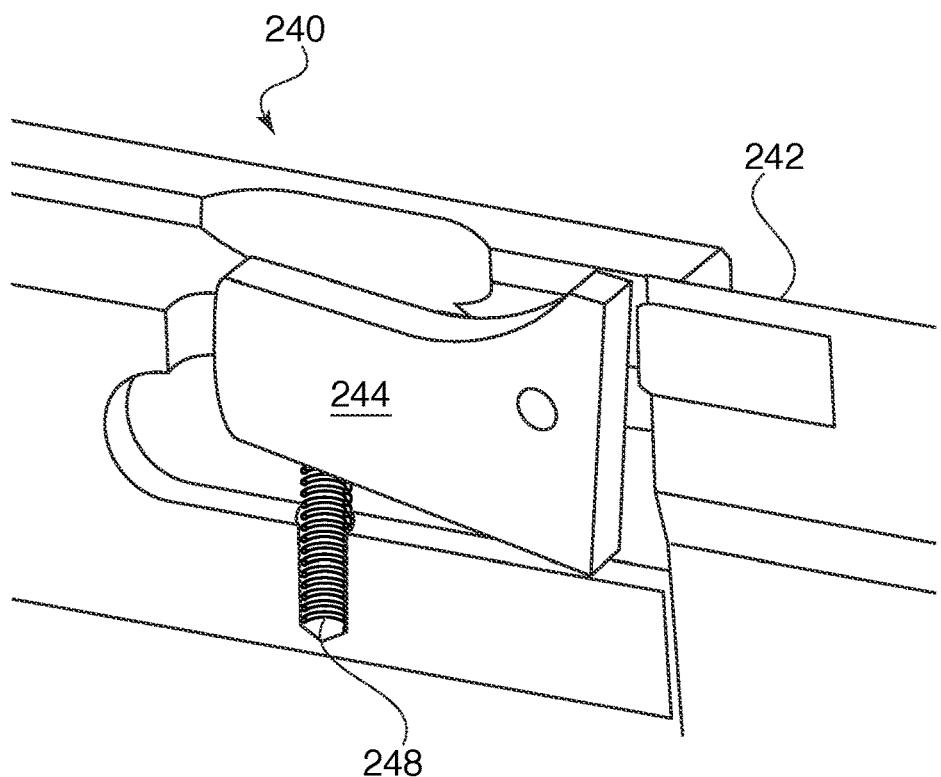
FIG. 25B shows a side perspective view of the release system of FIG. 25A in the release position.

FIGS. 25A and 25B illustrate one example of a possible release system 240. As illustrated, the release system includes a member 242 that applies pressure to a block 244. The member 242 functions as an emergency lever. When the emergency lever is activated, it pushes into the block 244. The pressure rotates at least a portion of the block 244 down in order to create a path for the connection member (such as a protrusion 226) to release. The connection members provide the connection between the door and the track base 238, but they are only held in place by the block 244. The block 244 in an upper position may be held raised by spring 248.

In the following, further examples are described to facilitate the understanding of the disclosure of this invention:

Example A. In one example, there is provided passenger seat egress system, comprising: a passenger seat area divided from an aisle or other common area by a privacy feature, wherein the privacy feature offers a primary egress from the passenger seat area and a secondary egress from the passenger seat area.

Example B. The egress system of any of the preceding or subsequent examples, wherein the primary egress comprises a sliding door configured to slide into and out of a wall pocket in order to open a close a passageway space.

Example C. The egress system of any of the preceding or subsequent examples, wherein the secondary egress comprises one or more hinges on the sliding door, such that if sliding movement into and out of the wall pocket is blocked, the door is hingeable.

Example D. The egress system of any of the preceding or subsequent examples, wherein one or more hinges comprise one or more vertical hinges that hinge the door away from the passageway space.

Example E. The egress system of any of the preceding or subsequent examples, wherein the sliding door comprises a plurality of vertical panels, and wherein the one or more hinges comprise vertical hinges that allow the panels to accordion fold.

Example F. The egress system of any of the preceding or subsequent examples, wherein the sliding door comprises more than one horizontal panel, and wherein the one or more hinges comprise one or more horizontal hinges that allow an upper panel to fold over a lower panel.

Example G. The egress system of any of the preceding or subsequent examples, wherein the sliding door comprises a plurality of panels, and wherein the secondary egress comprises a first panel that drops into a pocket of a second panel.

Example H. The egress system of any of the preceding or subsequent examples, wherein the secondary egress comprises removing the sliding door from the housing frame.

Example I. The egress system of any of the preceding or subsequent examples, wherein the primary egress comprises a first and second sliding doors configured to slide into and out of front and rear wall pockets in order to open a close a passageway space.

Example J. The egress system of any of the preceding or subsequent examples, wherein the secondary egress comprises at least one of the first and second sliding doors comprising a lowerable section.

Example K. The egress system of any of the preceding or subsequent examples, wherein the secondary egress comprises a removable panel.

Example L. The egress system of any of the preceding or subsequent examples, wherein the primary egress comprises a first and second sliding doors configured to slide into and out of a central stow feature.

Example M. The egress system of any of the preceding or subsequent examples, wherein the privacy feature comprises one or more hinged panels, and further comprising a releaseable securement member configured to secure the hinged panels as a rigid door and wherein removal of the releaseable securement member allows the panels to hinge.

Example N. The egress system of any of the preceding or subsequent examples, comprising a passenger seat area divided from an aisle or other common area by a privacy feature, wherein the privacy feature offers a primary egress from the passenger seat area and a secondary egress from the passenger seat area, wherein the primary egress comprises a sliding door mounted on a track system housed within a housing, wherein the secondary egress comprises releasing the door from the track system and storing the door in the housing.

Changes and modifications, additions and deletions may be made to the structures and methods recited above and shown in the drawings without departing from the scope or spirit of the disclosure or the following claims.

What is claimed is:

1. A passenger seat egress system, characterized in that it comprises:
   a passenger seat area divided from an aisle or other common area by a privacy feature, wherein the privacy feature offers a primary egress option from the passenger seat area and a secondary egress option from the passenger seat area
   wherein the primary egress option comprises a sliding door mounted on a track system housed within a housing, wherein the track system includes a track base supporting one or more protrusions that are shaped and configured to cooperate with one or more receiving portions on an upper portion of the door, wherein the receiving portions are shaped as elongated slots with narrowed portions therebetween, wherein a channel is running below the elongated slots and the narrowed portions;

wherein the secondary egress option comprises the door being releasable from the track system and storable in the housing, wherein the secondary egress option comprises a release system that can be activated to disengage the one or more protrusions from the channel.

2. The system according to claim 1, characterized in that the protrusions are shaped as wide-headed pegs.

3. The system according to claim 1, characterized in that the door is aligned with the channel and the protrusions are received into the channel, so that the door is allowed to slide along the track system in regular use.

4. The system according to claim 1, characterized in that the release system includes an emergency member that applies pressure to a block.

\* \* \* \* \*